United States Patent [19]
Rhody et al.

[11] Patent Number: 6,047,082
[45] Date of Patent: Apr. 4, 2000

[54] AUTOMATIC LENS INSPECTION SYSTEM

[75] Inventors: Harvey E. Rhody, Fairport, N.Y.; Billy C. Leung, Olney, Md.; David H. Xu, Shanghai, China

[73] Assignee: Wesley Jessen Corporation, Des Plaines, Ill.

[21] Appl. No.: 08/971,160

[22] Filed: Nov. 14, 1997

[51] Int. Cl.⁷ .................................................. G01B 11/00
[52] U.S. Cl. ............................................ 382/141; 382/143
[58] Field of Search .................................. 382/141, 143, 382/199, 291; 356/124, 237

[56] References Cited

U.S. PATENT DOCUMENTS

| | | | |
|---|---|---|---|
| 3,841,760 | 10/1974 | Guyton | 356/124 |
| 4,118,730 | 10/1978 | Lemelson | 358/93 |
| 4,148,061 | 4/1979 | Lemelson | 358/101 |
| 4,338,626 | 7/1982 | Lemelson | 358/93 |
| 4,408,291 | 10/1983 | Gunzberg et al. | 364/900 |
| 4,495,313 | 1/1985 | Larsen | 523/106 |
| 4,511,918 | 4/1985 | Lemelson | 358/107 |
| 4,565,348 | 1/1986 | Larsen | 249/122 |
| 4,640,489 | 2/1987 | Larsen | 249/122 |
| 4,680,336 | 7/1987 | Larsen et al. | 524/548 |
| 4,691,820 | 9/1987 | Martinez | 206/205 |
| 4,889,664 | 12/1989 | Kindt-Larsen et al. | 264/2.6 |
| 4,956,783 | 9/1990 | Teranishi et al. | 364/468 |
| 4,969,038 | 11/1990 | Lemelson | 358/107 |
| 4,979,029 | 12/1990 | Lemelson | 358/93 |
| 4,980,993 | 1/1991 | Umezaki | 51/165.71 |
| 4,984,073 | 1/1991 | Lemelson | 358/93 |
| 5,023,714 | 6/1991 | Lemelson | 358/107 |
| 5,039,459 | 8/1991 | Kindt-Larsen et al. | 264/2.6 |
| 5,067,012 | 11/1991 | Lemelson | 358/93 |
| 5,080,839 | 1/1992 | Kindt-Larsen | 264/2.6 |
| 5,094,609 | 3/1992 | Kindt-Larsen | 425/445 |
| 5,119,190 | 6/1992 | Lemelson | 358/93 |
| 5,119,205 | 6/1992 | Lemelson | 358/93 |
| 5,128,753 | 7/1992 | Lemelson | 358/101 |
| 5,134,574 | 7/1992 | Beaverstock et al. | 364/551.01 |

(List continued on next page.)

FOREIGN PATENT DOCUMENTS

| | | | |
|---|---|---|---|
| 2057832 | 6/1992 | Canada | G01M 11/00 |
| 63761A1 | 3/1982 | Germany | G01B 11/24 |
| 3432002 C2 | 3/1986 | Germany | G01B 11/24 |
| 62-330970 | 3/1989 | Japan | G02C 7/04 |
| 2171 812 | 9/1986 | United Kingdom | G01B 11/30 |
| 0 604 174 A2 | 6/1994 | United Kingdom | G01M 11/02 |
| 0 604 178 A1 | 6/1994 | United Kingdom | G01M 11/02 |
| 0 604 179 A2 | 6/1994 | United Kingdom | G01M 11/02 |
| 0 604180 A2 | 6/1994 | United Kingdom | G01M 11/02 |
| 0 605 990 A2 | 7/1994 | United Kingdom | G01M 11/02 |
| 0 607 692A2 | 7/1994 | United Kingdom | G01M 11/02 |
| 0 605 171 A2 | 7/1995 | United Kingdom | G01M 11/02 |
| 0 686 585 A2 | 12/1995 | United Kingdom | B65G 47/90 |

OTHER PUBLICATIONS

Kenji Suzuki, Iwao Ogura and Teruji Ose, Measurement of spherical aberrations using a solid–state image sensor, Jun. 18, 1979, Applied Optics, vol. 18, No. 22, Nov. 15, 1979.

*Primary Examiner*—Thomas D. Lee
*Assistant Examiner*—Stephen Brinich
*Attorney, Agent, or Firm*—Brinks Hofer Gilson & Lione

[57] ABSTRACT

An automatic system for inspecting contact lenses that are suspended in a saline solution within a lens holder. In the manufacturing process a first electronic image is taken of each lens disposed in its holder. Thereafter a second image is taken of the lens after the holder has been rotated and the solution and lens have moved. The two images are compared and any dark spots on the first image that move with respect to the second image are eliminated as artifacts that are caused by contaminants in the solution or marks on the lens holder. The rim of the lens, optical zone, printed logo and colored iris area of the lens are automatically inspected by a computer program for defects. The lens is rejected if defect features are found in any of the inspected areas.

87 Claims, 23 Drawing Sheets

U.S. PATENT DOCUMENTS

| | | | |
|---|---|---|---|
| 5,144,421 | 9/1992 | Lemelson | 358/101 |
| 5,153,444 | 10/1992 | Maeda et al. | 250/562 |
| 5,249,045 | 9/1993 | Lemelson | 358/93 |
| 5,255,331 | 10/1993 | Kelly | 382/50 |
| 5,283,641 | 2/1994 | Lemelson | 358/92 |
| 5,303,023 | 4/1994 | Portney et al. | 356/124.5 |
| 5,339,257 | 8/1994 | Layden et al. | 364/552 |
| 5,351,078 | 9/1994 | Lemelson | 358/135 |
| 5,443,152 | 8/1995 | Davis | 206/5.1 |
| 5,461,570 | 10/1995 | Wang et al. | 364/468 |
| 5,542,168 | 8/1996 | Best | 29/407.04 |
| 5,574,554 | 11/1996 | Su et al. | 356/124 |
| 5,604,583 | 2/1997 | Byron et al. | 356/124 |
| 5,882,698 | 3/1999 | Su et al. | 425/215 |

| | | C1 | C2 | C3 | | |
|---|---|---|---|---|---|---|
| | C4 | C5 | C6 | C7 | C8 | |
| C9 | C10 | C11 | C12 | C13 | C14 | C15 |
| C16 | C17 | C18 | C19 | C20 | C21 | C22 |
| C23 | C24 | C25 | C26 | C27 | C28 | C29 |
| | C30 | C31 | C32 | C33 | C34 | |
| | | C35 | C36 | C37 | | |

…

AUTOMATIC LENS INSPECTION SYSTEM

TECHNICAL FIELD

The invention concerns an automated system for inspecting lenses, for example contact lenses. More particularly, the invention concerns a system wherein digital images of a lens are automatically inspected by a computer in order to determine whether the lens has been satisfactorily manufactured or must be rejected as defective. This automatic computerized lens inspection system analyzes digital image data at the edge of the lens, the optical center of the lens and in color printed regions of the lens. The inspection system is particularly useful in differentiating real defects from apparent defects caused by specs of dirt or other contaminants that are deposited on or adjacent to a lens.

BACKGROUND OF THE INVENTION

In the contact lens manufacturing industry, it is well known that automated inspection of contact lenses offers the opportunity to reduce production costs while increasing product consistency. Automated systems have therefore been designed to examine and reject lenses with specific kinds of defects. The goal in such automated systems has been to inspect for all defects that are of importance in product quality control and to eliminate the need for human inspection except as needed to verify the ongoing performance of the automated system.

It is generally understood that a well-designed automated inspection system is more consistent than a human inspection system because the automated system does not suffer from fatigue, distractions, or changes in subjective inspection criteria. Also, an automated system offers the opportunity to gather a large amount of data for statistical analysis, and in that way provides a means for objective quality control. This statistical base can be the foundation for continuous improvement in both the manufacturing and inspection processes.

Lens inspection systems for contact lenses may have individual containers that carry a contact lens in a saline solution. In such systems, each hydrated lens is microscopically examined for defects, for example at the edge and optical center of the lens. One such lens inspection system is disclosed in U.S. Pat. No. 5,443,152, issued Aug. 22, 1995 to Davis. This system uses dark field illumination to inspect a hydrated lens disposed in a transparent frustoconical holder. Method steps are disclosed for inspecting various parts of the lens.

In automated lens inspection systems, minute particles of dirt or other contaminants can enter the saline solution of the lens holder or can adhere to the base of the holder. The base of the lens holder can also become scratched in the process of manufacturing. The scratches and contaminants on the lens holder and in the saline solution will appear as dark spots in the image of the contact lens. An automatic inspection system could detect these dark spots and erroneously identify them as defects in the lens. It is therefore necessary to provide a means whereby such artifacts can be ignored so that they do not affect the inspection process. The lens inspection system of the invention greatly reduces the number of such artifacts and therefore enhances the reliability of the inspection process.

An automatic contact lens inspection system must also be particularly sensitive to defects, such as minute notches or tears at the periphery of the lens. Known systems have not provided a sufficiently robust and accurate method for detecting such defects. The system of the invention employs a particularly accurate method for detecting defects at the edge of the lens.

It is also important in a lens inspection system to provide a reliable and accurate means for detecting defects at the optical center of the lens and in the color printing of an iris portion of the lens. Also, if a company logo or other reference mark is printed on the lens, the inspection system must be able to detect unacceptable defects in the printing of any such logo or mark. The inspection system of the invention achieves reliable and accurate detection of such defects by utilizing an inspection matrix of brightness values for at least two images of each lens and robust inspection algorithms. The accuracy, speed and simplicity of the automated system of the invention has not heretofore been demonstrated in the art.

SUMMARY OF THE INVENTION

In order to achieve the objects of the invention and to overcome the problems of the prior art, the improved automated lens inspection system of the invention records two or more images of each inspected lens. The first image of a lens shows dark spots that may be due to actual lens defects or contaminants on a cuvette that holds the lens or in a saline solution in which the lens is immersed. The second image of the lens is taken after the cuvette and its saline solution have been twirled so that contaminants in solution or scratches or other marks on the cuvette are moved relative to the location and position of the lens image. The stored images of the lens are then registered and compared to one another. A resultant image is formed from the brightest of each pair of compared pixels (picture elements) and the dark spots caused by moving artifacts are therefore removed from the resultant image. Any remaining dark spots correspond to actual defects of the lens. The defects are therefore reliably detected and artifacts caused by contaminants and cuvette scratches are eliminated.

In operation of the automated lens inspection system of the invention, the level of ambient light is detected and the output of a CCD image device of an optical inspection station is normalized for variations in ambient light across the field of the image. This normalization process ensures that the image of the lens under inspection is not affected by variations in ambient light.

In analyzing the resultant image of the lens, the center of the lens is first located by a computer algorithm that draws chords across the lens and takes the midpoint of the chords to determine the approximate position of the center of the lens. The light intensity of pixels of the lens is then registered in polar coordinates. This light intensity information in polar coordinate form is stored in a matrix wherein light intensity values at incremented angles are listed in rows of the matrix and the light intensity values for incremental radii are listed in columns. This matrix presentation of the light intensity data facilitates the analysis of defects. The matrix shall be referred to hereafter as the S-matrix. When the S-matrix data for the two images of a lens are compared and combined, the resultant S-matrix contains the light intensities of pixels of the image with artifacts removed.

The ink pattern of the iris of the lens is analyzed for white spots of excessive size. The logo printed on the lens is also analyzed to determine if there is complete formation of the letters that make-up the logo. The optical zone of the lens is analyzed to locate black spots. The lens is rejected if black spots are located in the optical zone or if the ink pattern or logo have serious defects.

An edge portion of the data of the S-matrix for each image of a lens is used to construct polynomial approximations of line segments that model the periphery of the lens. These polynomial approximations are overlapped and combined to model the edge. The polynomial model of the edge of each of the images is then compared to the actual edge data to detect abrupt transitions in the data. These transitions indicate tears or other defects at the edge. The defects detected at the two image edges are then compared and a defect is recognized if it was located in the same area of the edge for each image of the lens.

The advantages and features of the invention will be apparent from the following description, claims and drawings.

BRIEF DESCRIPTION OF THE DRAWINGS

FIG. 7 is an illustration of the polar coordinates disposed in an S-matrix of the lens image of FIG. 4a.

FIG. 8 is a chart that shows the brightness profile along a radial cut through a dark spot of the lens of FIG. 4a.

FIG. 9 is a chart that shows a surface plot of the S-matrix in a region near the rim of the lens of FIG. 4a.

DETAILED DESCRIPTION OF PREFERRED EMBODIMENTS

The Apparatus

Figure 1:
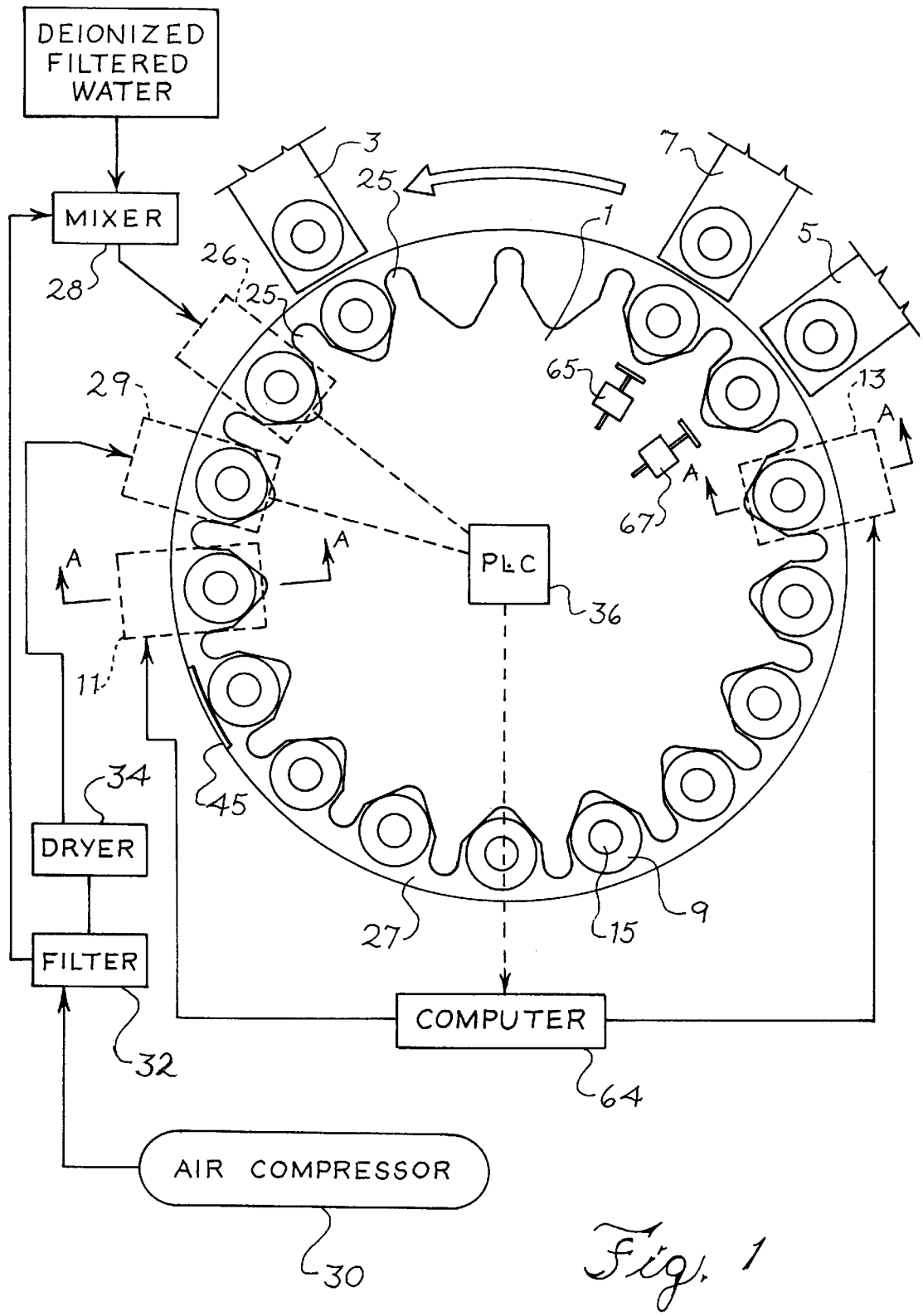
FIG. 1 is a plan view of a star-wheel and associated conveyors and cuvettes as used in the automatic lens inspection process of the invention.
Figure 2:
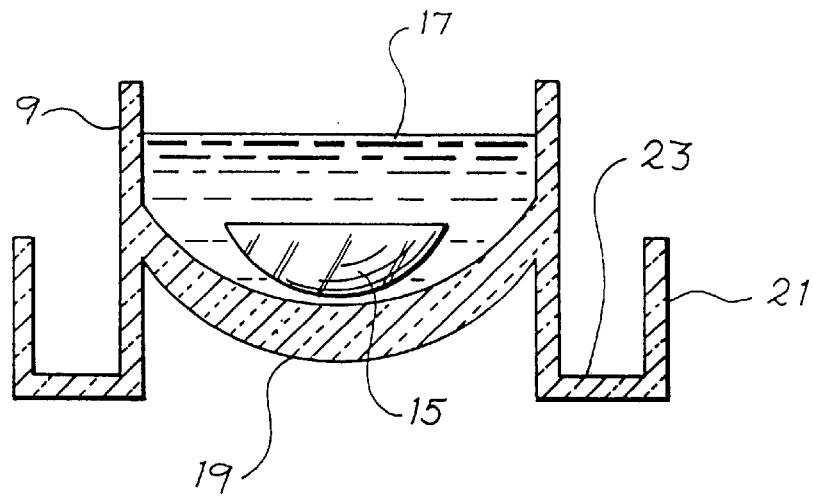
FIG. 2 is a partial cross-sectional view of the cuvette that holds a hydrated lens in a saline solution.

FIG. 1 illustrates a plan view of a star-wheel 1 and conveyors 3, 5 and 7 that interact in the lens inspection system to move transparent cuvettes 9 and contact lenses 15 with respect to optical inspection stations 11 and 13 that take bright field images of the cuvettes and lenses. FIG. 2 shows a partial cross-sectional view of the cuvette 9 that holds a contact lens 15 in a saline solution 17. The cuvette 9 is made of a watertight transparent material, such as glass, an optically clear polycarbonate or polymethylmethacrylate plastic. The contact lens 15 is a hydrogel such as is known in the art. An outer annular wall 21 of the cuvette forms a spillway 23 that retains any small amount of the saline solution 17 that may be spilled in movement of the cuvette. The wall 21 also acts as a bumper between cuvettes as they are moved in the inspection process. As shown in the figure, the hydrated lens 15 expands to its normal shape and falls to the bottom of the cuvette 9.

The bottom portion 19 of the cuvette 9 has a concave inner surface which has a radius of curvature that allows the contact lens 15 to slide downward under the force of gravity to a centered position in the cuvette. The radius of curvature of the cuvette's concave inner surface is chosen to be as steep as possible in order to maximize the centering ability of the cuvette and shallow enough to maintain center contact with the hydrated lens under inspection. This structure minimizes the distance that a lens can move in the time typically required for video cameras of the optical inspection stations 11, 13 to obtain an image of the lens in the inspection process. It is highly desirable to restrict the distance the lens can move in one video time frame, for example 1/30 second, to a distance less than the smallest feature of the inspected lens.

The optically clear bottom portion 19 of the cuvette forms a lens. The concave inner and convex outer surfaces of the bottom portion 19 of the cuvette provide optical power in combination and serve to focus light through the hydrated contact lens 15 to the entrance pupil of each camera of the optical inspection stations 11, 13.

In the lens inspection system, a saline solution is injected into the cuvettes 9 that move along a conveyor and a contact lens is placed in solution in each cuvette. The cuvettes with hydrated lenses are moved along the input conveyor 3 until they reach the end of the conveyor and are disposed between teeth 25 formed in the star-wheel 1 that is indexed, for example in a counterclockwise direction, at a rate of about one rotational position every 1.6 seconds. Although this indexing speed is satisfactory, a greater or lesser speed could be employed.

Figure 3:
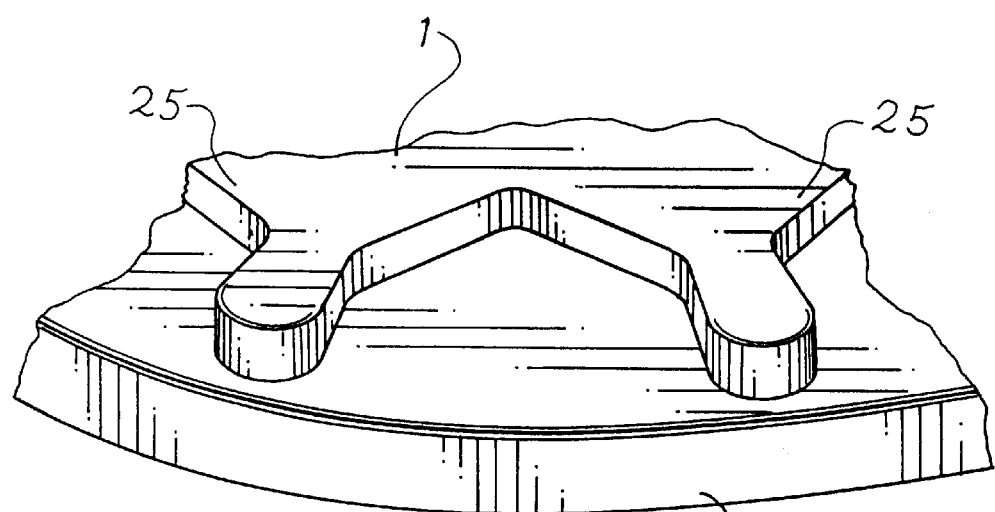
FIG. 3 is a partial perspective view of the star-wheel and support mechanism of FIG. 1.

FIG. 3 illustrates a perspective view of two adjacent teeth 25 of the star-wheel which rotates on an underlying stationary circular platform 27 and thereby pushes the cuvettes from the input conveyor 3 in a counterclockwise direction. As shown in FIGS. 1 and 3, each pair of teeth forms an area that receives and holds one of the cuvettes. The star wheel 1 of FIG. 1 is shown with 17 cuvette holding areas for simplicity of illustration. In practice, a star wheel having 32 such areas has been used. Either a greater or lesser number of such areas could be used, depending upon the requirements of the manufacturing system.

A washing station 26 sprays the bottom of each cuvette with a blast of water and compressed air that is supplied by a mixer 28 which combines filtered, deionized water with the filtered air of a compressor 30 that supplies air at a pressure of 20 psi or any other suitable pressure. The water spray removes contaminants and saline droplets from the bottom of the cuvette.

A drying station 29 removes any water droplets that may adhere to the bottom of the cuvette. The station 29 blows filtered, dry air from the conventional air compressor 30 against the bottom of each cuvette. An in-line air filter 32 removes any particles from the compressed air and a moisture trap 34 removes moisture from the air as it flows to the cuvette. A conventional filter-regulator-dryer unit, for example a Vortec 208R, could be used to obtain filtered, dry air.

The speed of indexing of the star-wheel and the timing of the washing and drying air blasts are controlled by a conventional production line programmable logic controller (PLC) 36, for example a Series DL-5 which is commercially available from the Allen-Bradley Company. The PLC is adjusted and operated in a known manner.

A rigid cuvette guide (not shown) is mounted to the stationary structure of the star wheel and disposed above the cuvettes at the washing and drying stations so that the blasts of air at these stations do not lift the cuvettes off of the star wheel. Holes may be drilled through the guide to allow the passage of air while preventing upward movement of the cuvettes. A rectangular shaped piece of rigid plastic or any other suitable material, including metal, could be used for this purpose.

Figure 4A:
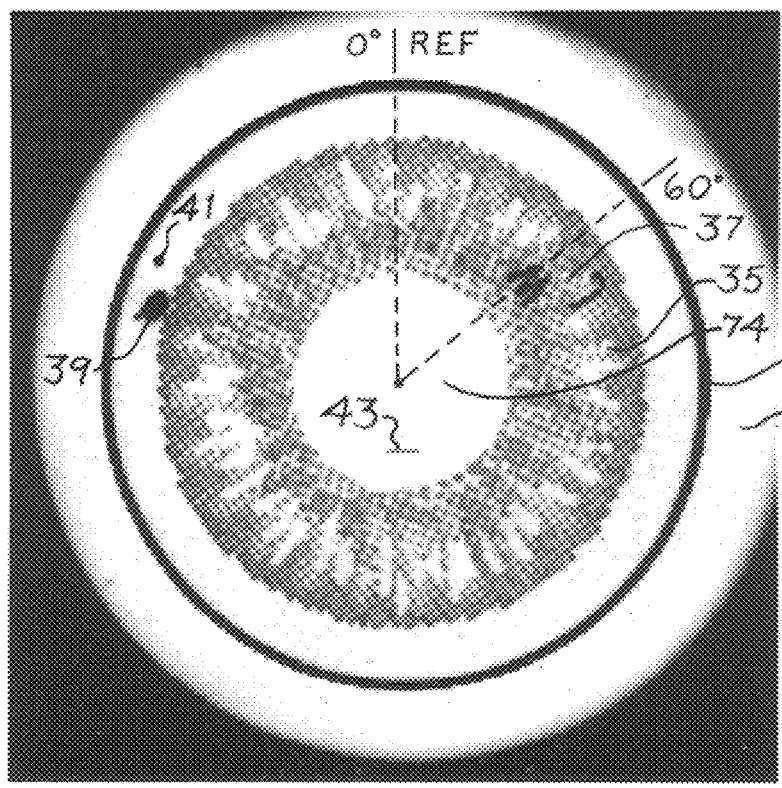
FIG. 4a is an illustration of a first light field image of a hydrated lens disposed in a cuvette.

In the lens inspection system, a camera of the optical inspection station 11 takes and stores a first magnified digital image of each of the lenses as they pass along the star-wheel. FIG. 4a shows an example of such an image. The outer circular bright region 31 is the cuvette that contains the lens. The dark circular ring 33 is the edge of the lens and the annular region 35 is printed with a colored iris pattern. The WJ Wessley Jessen logo 37 is printed in the colored iris region. The dark spot 39 is a lens defect. The spot 41 is a dirt particle in the saline solution and the line 43 is a scratch on the cuvette.

As shown in FIG. 1, a cuvette rotation element 45 at the periphery of the star-wheel presses against and lightly adheres to each cuvette as it moves counterclockwise with the star-wheel after its first image is taken. A sticky tape may be used to impart a clockwise rotational movement to each cuvette as it moves with the star-wheel. The rotation of the cuvette causes the saline solution 17 and lens 15 to swirl within the cuvette.

The cuvette stops rotating when it passes the tape element 45 and the swirling motion of the lens and saline solution slows and eventually stops by the time the cuvette reaches a second optical inspection station 13. It has been determined that this settling process could take as long as 10 seconds. As a consequence of this particular timing, ten first images of lenses and cuvettes are taken between the first and second optical inspection stations 11 and 13. The inspection system is not limited to 10 positions between inspection stations. Either more or fewer positions could be used.

Figure 4B:
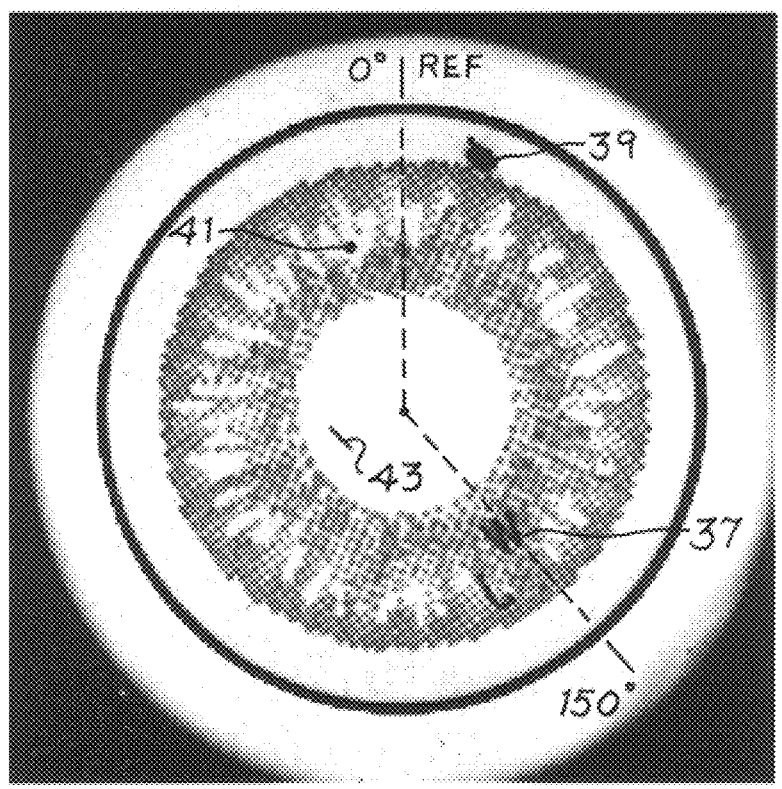
FIG. 4b is an illustration of a second light field image of the hydrated lens of FIG. 4a after the cuvette is rotated.

At the second station 13, a camera takes a second image of each lens when it has stabilized and stopped its rotational movement. FIG. 4b shows the second image in which the lens, cuvette and saline solution have moved with respect to their positions in the first image of FIG. 4a. It can be seen that the relative positions of the lens defect 39 and WJ logo 37 are the same because they are both fixed features of the lens. The changed location of the scratch 43 corresponds to the movement of the cuvette and the location of the dirt particle 41 corresponds to the movement of the saline solution.

It should now be understood that each cuvette has an associated first and second image, with the second image having a displaced lens, solution and cuvette with respect to the first image. Particulate contaminants in the saline solution and spots or scratches on the bottom of the cuvette will show as dark spots in the first image. These spots will move relative to the lens when the cuvette is rotated and will therefore have different positions in the second image which will be apparent if this image is oriented so that the contact lenses of the two images are aligned. The relative movement of dark spots is used to distinguish the spots as artifacts and not real defects in the lens. The process of artifact differentiation will be explained in detail after the following further discussion of the apparatus of the system.

Figure 5:
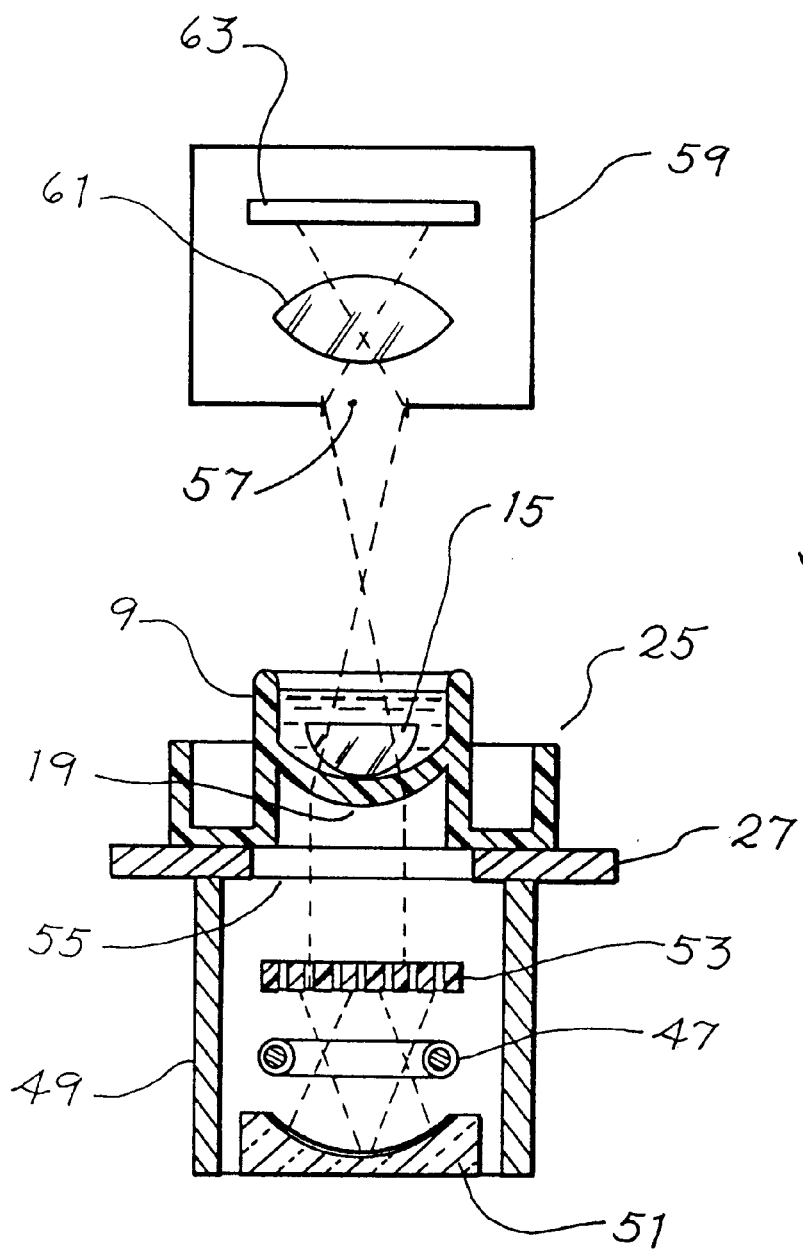
FIG. 5 is a diagrammatic and partial cross-sectional view of the cuvette, lens inspection camera and strobe light assembly of an inspection station for the lens inspection system of the invention.

FIG. 5 illustrates a diagrammatic and partial cross-sectional view of each of the optical inspection stations 11 and 13 taken along the center lines AA of FIG. 1 in the direction of the arrows. Further as shown in FIG. 5, a strobe light 47 is disposed beneath the circular platform 27 to provide a high intensity pulse of light. A light baffle tube 49 is provided to contain the intense light pulse of the strobe 47. A model MVS 2020 strobe light is commercially available from EG&G Electro-optics of Salem, Mass. and can be used to provide the strobe light pulse.

The strobe achieves a stop action image of the lens 15 within the cuvette 9. That is, the strobe is of sufficient brilliance to form an image of the contact lens in less than the time it takes for any part of the image to move by as much as one pixel on the focal plane when the cuvette moves at the speed of the automated inspection system. The light pulse of the strobe is randomly deflected by a diffuser 51 to provide a diffused light pulse. The diffused light of the strobe 47 and diffuser 51 passes through a collimated holes disk 53 that in a preferred embodiment is made of a black opaque glass approximately 20 mm in diameter and 2 mm thick, with a grid of about 600,000 holes, each about 20 $\mu$m in diameter. The disk is commercially available as Part No. 781-0009 from Collimated Holes, Inc. of Campbell, Calif.

The collimated light from the collimator disk 53 passes through a hole 55 formed in the circular platform 27. The light then passes through the bottom lens portion 19 of the cuvette. The lens 19 focuses the collimated light through the hydrated contact lens 15 and through an aperture 57 of a digital video camera 59 having at least one lens 61 and an associated CCD imaging device 63. The cuvette and collimator disk are preferably separated so that the disk is outside the camera's depth-of-field and only the focused image of the lens and cuvette are obtained by the camera.

The Kodak Megaplus video camera, Model XFH and its control unit, are commercially available from the Kodak Company and could be used with a Nikon MicroNikkor AF 60 mm lens for the lens inspection station. The CCD array of this camera provides an image of 1,000 by 1,000 pixels at 30 frames/sec. Thus, the first and second optical inspection stations corresponding to FIG. 5 take instantaneous strobed images of the contact lenses that pass through the stations. As shown at FIG. 1, these images are digitized and are stored in the random access memory of an inspection computer 64 which has, for example, a 200 MHz Pentium Pro Processor. This computer interfaces with the PLC 36 and controls the timing at which the camera images are taken.

When the cuvettes leave the second optical inspection station 13 the computer analyzes the first and second image for each lens and, based upon this analysis, determines whether the lens has defects and should therefore be rejected. If the automatic analysis determines that the lens should be rejected, the computer 64 activates a solenoid plunger 65 which pushes the lens to the reject conveyor 7. If the lens and the cuvette pass the automated inspection analysis, the cuvette is moved in a counterclockwise direction along the star-wheel and the computer 64 activates a solenoid plunger 67 which pushes the cuvette to a pass conveyor 5.

Defect Categories

The automated lens inspection system can detect many different kinds of lens defects and differentiate these defects from artifacts caused by contaminants or scratches on the cuvette. The defects that result in rejection of the lens are:

1. Darkness patches in the optical zone at the central area of the lens. Darkness in this area reduces the performance of the lens;
2. Gross imperfections in the printed iris pattern. Some kinds of lenses have a printed iris pattern in an annular ring around the optical zone. If this pattern is not correctly centered or is misprinted in a variety of ways it will reduce the attractiveness and functionality of the lens;
3. Imperfections in printing the logo, particularly on clear lenses. The logo is used as a reference mark by the user to orient the lens. A damaged or missing logo is a defect;
4. Mechanical defects in the lens material. These include tears, nicks, cuts, holes, folds and other problems;
5. Foreign material attached to the lens. Any kind of dirt or "flash" that is attached to the lens can be a functional and safety problem, and must be detected; and
6. Nicks or cuts on the rim of the lens.

Normalization of Illumination

Algorithms have been developed which detect the listed defects to an acceptable level. Each type of defect has a rejection threshold that can be changed in the algorithm to meet changes in detection criteria. Some components of the defect inspection algorithms must be able to perform a reliable analysis even though the image illumination is uneven. Uneven illumination can arise because of variations in either the illumination system or in the optical elements of the imaging system. The illumination variations typically have a slow variation across the image. The effect of these variations can be greatly reduced by using a normalization algorithm.

The illumination variations can be modeled with a linear function in the image coordinates. Let (x,y) represent a point in the image plane. A linear illumination model is provided by the equation:

$$I(x,y)=ax+by+c$$

where (a,b,c) are parameters. If a=b=0 then the illumination does not change with position, and has a uniform brightness given by the value of c. If there is a variation then a and b provide the magnitude of the change with respect to changes in location in the x and y directions, respectively.

The values of the parameters can be calculated by a simple least-squares fit to brightness data that is sampled across the bright regions of the image. For example, brightness measurements at pixels in the cuvette region just outside the rim of the lens are detected and stored. These values will vary if the illumination is not uniform. The values of the parameters of the equation are found by fitting a linear function to the brightness data.

Let $I_k$ be the brightness at sample point $(x_k,y_k)_1$ k=1,2, . . . , n. Then the least-squares solution for the parameters is found by solving a simple set of three equations in three unknowns.

$$ag_{xx}+bg_{xy}+cg_x=f_x$$

$$ag_{xy}+bg_{yy}+cg_y=f_y$$

$$ag_x+bg_y+cg_0=f_0$$

where $f_0=\Sigma_k I_k$, $f_x=\Sigma_k I_k x_k$, $f_y=\Sigma_k I_k y_k$, $g_{xx}=\Sigma_k x_k^2$, $g_{yy}=\Sigma_k y_k^2$, $g_{xy}=\Sigma_k x_k y_k$, $g_x=\Sigma_k x_k$, $g_y=\Sigma_k y_k$, $g_0=n$.

A similar technique can be used to model the illumination variation with a quadratic function. In that case terms are added for xy, $x^2$, and $y^2$. This leads to the requirement to solve for six parameters, something that is more complicated but similar in technique. In practice it has been found that linear modeling of illumination variations is sufficient.

We assume that the observed brightness value at a point (x,y) is due to the illumination passing through a medium with transmission value T(x,y). That is, B(x,y)=T(x,y)l(x,y). By dividing by a model of the illumination we largely remove the variations in the observations due to uneven illumination and preserve the brightness values due to variations in transmission. This is what we desire in the inspection process. Thus, the calculation $T^1(x,y)=B(x,y)/l(x,y)$, where l(x,y) is provided by the illumination model, provides a corrected image for further analysis.

Normalization is therefore achieved by sampling the illumination at a number of points throughout the bright region of the image plane. A mathematical function is then fitted to the illumination data. For each point in the image, the measured brightness is replaced with a corrected normalized value that is determined by the defined function.

The illumination function at any fixed camera location can be expected to change slowly from image to image. This makes it possible to accumulate the modeling data over a sequence of images as well as over each image. This procedure can be used to dynamically update the illumination model, which provides robustness, and to detect large illumination changes that may occur in particular images, which may indicate a defect in the cuvette. The illumination can also be normalized separately for each optical inspection station, thereby avoiding calibration issues and simplifying the normalization process in a production environment.

Lens Edge Location

The first step in the inspection of a lens is locating it in each of the images. The lens is located by finding several points that are likely to be on the edge of the lens. The process of finding the points is subject to errors due to noisy variations in the image, and therefore must be followed by a process that refines the set of edge points. The accuracy of the process is greater as the number of points increases.

Figure 6:
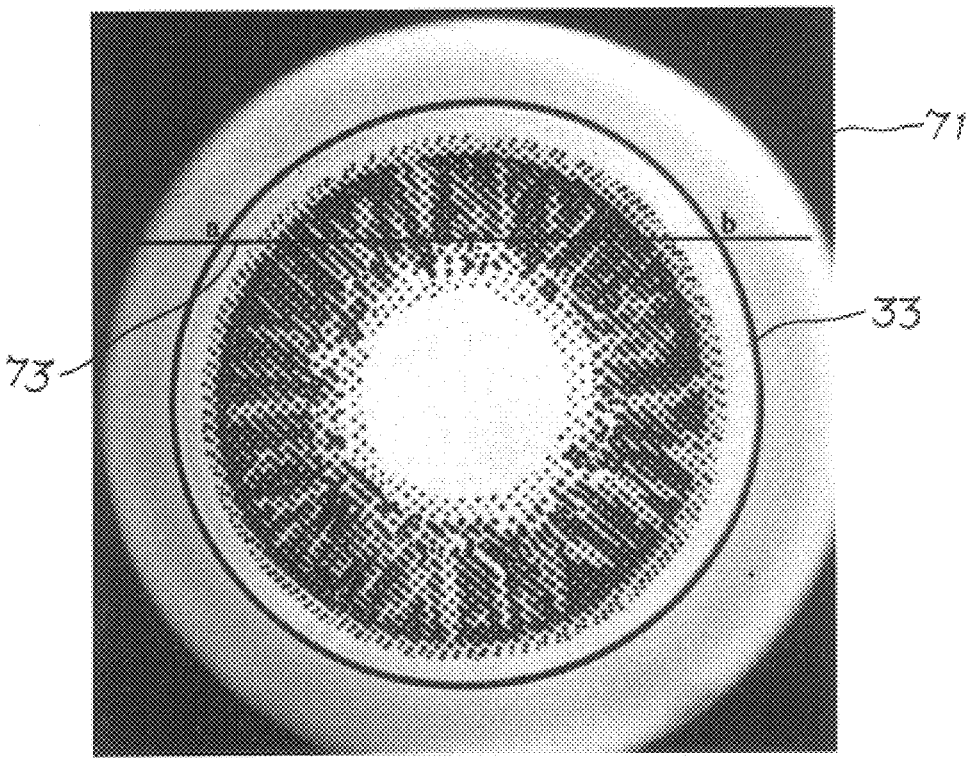
FIG. 6 is an illustration of a light field image of a hydrated lens disposed in a cuvette with a dark line added to show an edge location technique.

The point finding algorithm makes use of the knowledge that the edge of the lens is likely to be the first dark zone encountered if pixels are examined in an order that begins with an edge of the image and moves toward the opposite edge. A lens image is shown in FIG. 6. In it we see that the rim of the lens is a dark ring 33 against a lighter background. The disk-shaped light area outside the rim is created by light shining through the cuvette which contains the lens in its saline solution. The black background 71 in the corners of the image is the region outside the cuvette.

To find points on the edge, we need to look for a place where the brightness of a row or column of the CCD image drops rapidly after it has been at a high level. We require that it drop from a high level, rather than just be at be at a low level, to get past the black area outside the cuvette. On the scale of (0,1), with 0 corresponding to black and 1 corresponding to white, we would expect the brightness to change from a low level at the black periphery of the image to a level of 0.7 to 0.9 as we move inward to the bright area corresponding to the cuvette. We would expect the brightness to drop again, for example to about 0.3, to indicate the presence of the edge of the lens. A point "a" on the left edge of the lens can be found by detecting the minimum point of the narrow dark region at the rim of the lens. A point "b" on the right edge can be found by searching from the right side of the profile toward the center. In FIG. 6, the dark horizontal line 73 represents a row of pixels and the points labeled "a" and "b" represent points on the edge of the lens found by searching along the pixel row.

Center Location

Points on the rim of the lens can be found by scanning rows or columns of the CCD image as described above. A set of scans are performed over a set of rows and columns that are likely to cross the edge of the lens. If it is determined in the scan that an edge is not encountered, then that row or column is discarded from the set for that lens.

The points are captured in four sets: L, R, T, and B, corresponding to left, right, top and bottom edges. Each point has a row and column index. The center is estimated by averaging coordinate values from the sets.

The column index of the center, $C_x$ can be estimated by using the column data from the L and R sets. Let $\{i_1, i_2, \ldots i_m\}$ be the row numbers for which there is a data point in both the L and R sets. For any such row, $C_x$ should be midway between $u_L(i_j)$ and $U_R(i_j)$. The center can then be calculated by averaging over these estimates.

$$C_x = \frac{1}{2m}\sum_{j=1}^{m}(u_L(i_j) + u_R(i_j))$$

Similarly, let $\{i_1, i_2, \ldots i_n\}$ be the set of indices for which there is a data point in both the T and B sets. The row index of the center can then be calculated by $$C_y = \frac{1}{2n}\sum_{j=1}^{n}(u_T(i_j) + u_B(i_j))$$

The estimates of $(C_x, C_y)$ may be influenced by spurious outlier points. These points can be removed after the location of the lens boundary is estimated, and the center can be recalculated using the good points. The above formulas are then used with the refined data.

Inspection Matrix

The inspection matrix provides information about the light and dark patterns on the surface of the lens, and is the central structure for several inspection functions. The lens image can be naturally described by a function $B(r,\theta)$ in polar coordinates referenced to the center of the lens. Patterns on the lens can be observed by sampling the brightness pattern over a set of $(r,\theta)$ coordinates. Let $(r_m,\theta_n)$ $1 \leq m \leq M$, $1 \leq n \leq N$. Then the array of values $S=B(r_m,\theta_n)$, $1 \leq m \leq M$, $1 \leq n \leq N$ make up an M×N matrix whose columns represent brightness samples at a fixed angle and whose rows represent brightness samples at a fixed radius. This is the inspection matrix or S-matrix, which contains the essential brightness information in a rectangular data structure that is convenient for efficient processing. Although the S-matrix is rectangular, it contains data points that are over a polar grid, and represents a mapping from polar to rectangular format.

Figure 7:
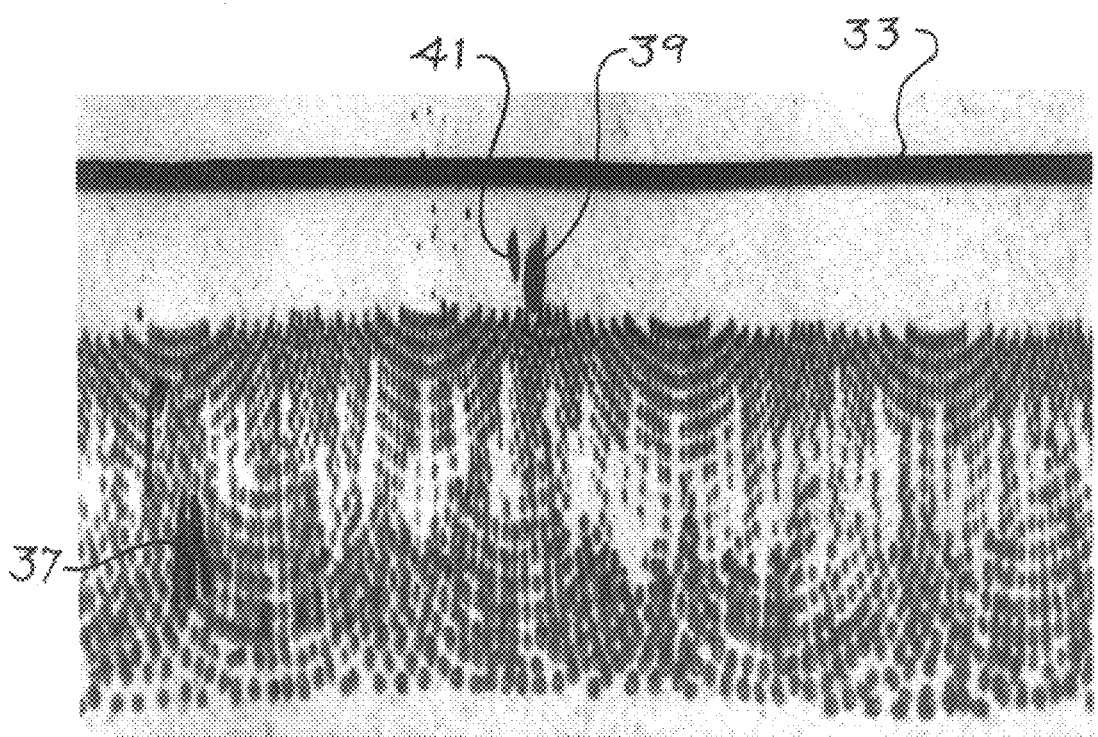

In a lens image such as is shown in FIG. 4a, it is clear that a natural reference system will be polar coordinates referenced to the lens center. In operation, a polar sampling grid is overlaid on the lens image and the S-matrix is the array of image values on these sample points. The grid is arranged to cover the lens from just inside the printed area to outside the rim. The image formed by the S-matrix is shown in FIG. 7. It is clear that the S-matrix contains the same information as the corresponding region of the original image.

Figure 8:
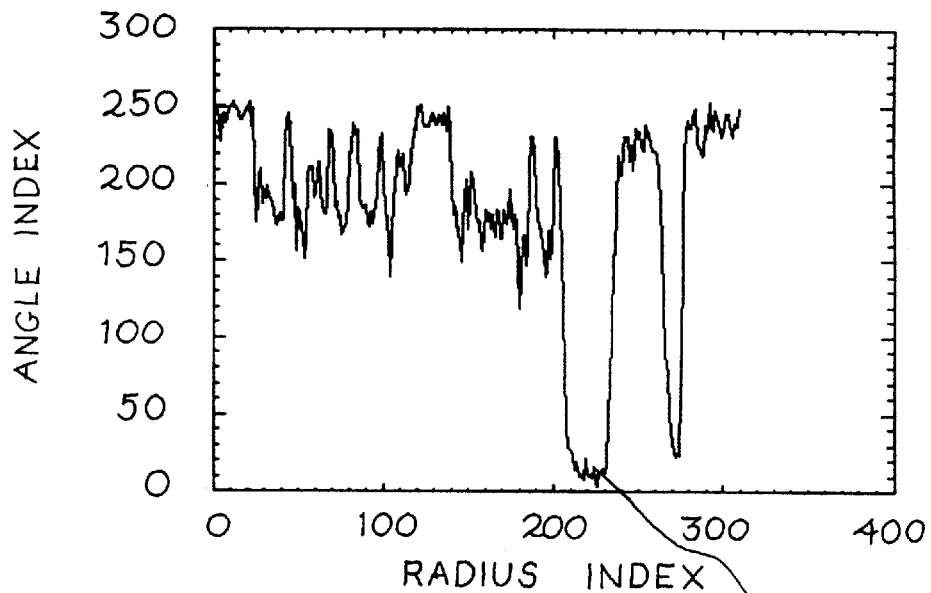

The brightness values in any part of the sampled region can be found in the S-matrix. As an example, the values along a radial slice that passes through the dark spot 39 on the lens is shown in the brightness profile chart of FIG. 8. This particular slice is represented by a data column of the S-matrix, which corresponds to an angle of approximately 290° relative to a 0° reference at the top of the lens. It clearly shows the effect of such a defect. The S-matrix therefore contains information that is a good foundation for inspection algorithms.

Figure 9:
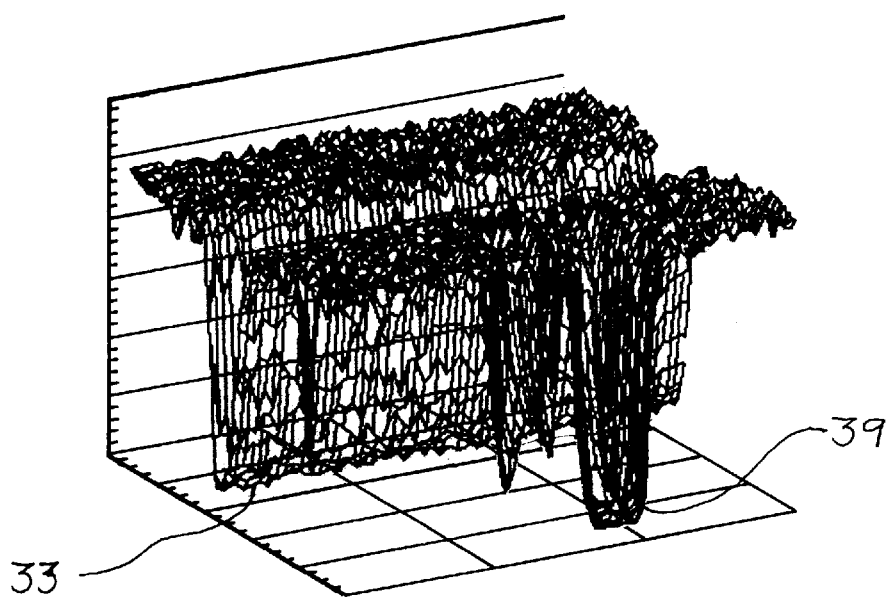

A second example of a presentation that is available from data in the S-matrix is shown in FIG. 9. This is a surface plot formed by a section of the S-matrix that covers the edge 33 and the dark blemish 39 of the lens. The trench formed by the edge should be uniform and straight in this presentation. Variations in the cross-section of the rim trench are the basis for the location of rim defects.

Optical Zone Inspection

The inspection of the central optical zone of the contact lens requires a method for removing dark spots due to foreign material. This is done by matching two or more independently gathered images, which serves to remove dark regions on either image that are not matched on the other.

A defect is a mark on the lens caused by a scratch, bubble, attached particle of foreign matter such as flash, and cuts or perforations. The defects can be found by searching for dark regions in the optical zone, because all of these defects are visible in the image as darkened areas. However, darkened areas are also caused by dirt in the saline solution, marks on the surface of the cuvette, and other such effects that are not related to the lens. These can be separated by using the fact that defects on the lens will move with the lens and appear in the same relative location in two images, while things that are not attached to the lens will be in different locations in the two images. Differentiation between artifacts and real defects requires that two images of the same lens be matched geometrically. This can be done by image combining. After the images have been combined, the optical zone can be inspected.

Images from the lenses must be combined in a manner that preserves the features that are common and eliminates the features that are not common. This is accomplished by the process of: (1) finding points on each image that match each other; (2) performing a geometric transformation which brings the matching points into registration; and (3) comparing all points in the registered image arrays to eliminate artifacts that are not part of the lens.

Each of the three steps can be accomplished by a variety of computational strategies. Each strategy leads to an algorithm and to implemented computer code on the inspection platform. The following describes an algorithm that accomplishes each of the three steps.

Finding Matching Points

The geometric matching algorithm described below uses six parameters. The values of the parameters are calculated by substituting the coordinates of three matching points on the two images into a set of equations. An accurate calculation requires that the three matching points must be known very accurately. Matching points are found by locating particular features on each image. Accurate matching requires that the features chosen for comparison have fine detail so that they can be located with precision. Locating features with precision requires a detailed image search. Accomplishing the search with speed is a necessity for a real-time application.

Lenses With Ink Patterns

The ink pattern on printed lenses provides an image that can be used as a source of points to be matched. FIG. 4a shows such an ink pattern 35. The challenge is to find matching image fields in two different lens images in a fraction of a second. The search is carried out by a hierarchical process which, at each step, refines the precision of the pattern location. The steps in locating matching points on lenses with ink patterns are given below. A later described modification is required for lenses without ink patterns.

1. Locate the center of each lens image.
2. Find a prominent reference point on each lens. The most common reference point is the lens logo. A line from the center through the reference point provides a zero-angle reference. The logo can be located accurately and reliably in the ink pattern with a hierarchical template matching search. The search can be carried out either on the lens data in polar coordinates or in the S-matrix of the lens in rectangular coordinates.
3. Find three points in the ink pattern of the first lens image at angles separated by about 120 degrees. The radius to ink micropatterns can be a fraction (say 0.5) of the distance to the rim. Form a template by cutting a small section of data from the ink pattern at each location. Let us call the three micropattern arrays $A_1$, $B_1$, and $C_1$. Note that we are not selective about the micropatterns that are chosen. The density of printed dots in the ink pattern makes it highly likely that a pattern suitable for matching will be obtained. A refinement would be to evaluate the quality of each micropattern at this step and to choose a replacement for any that were below standard for matching requirements.
4. Locate the three localities for matching micropatterns on the second lens image. The three localities have the same polar coordinates relative to the reference line as were used in the first lens image.
5. Do a local pattern search with micropattern $A_1$ in location 1. Select the pixel with a maximum match score. Repeat for the other two micropatterns.

Note that this procedure requires two gross pattern searches to find the logos in the ink field and three microsearches in very localized regions to match the patterns from the first image with those in the second image. Note that we do not preselect the micropatterns. The selection is simply the pattern cut out of a well-spaced location in the ink pattern. Experience has shown that this search procedure is fast and that it enables matching points on 1000×1000 pixel images to be located to within one pixel.

Lenses Without Ink Patterns

The location of reference points on lenses that do not have ink patterns cannot use micropatterns. The procedure is modified by (1) refining the logo location and (2) using points on the lens rim at known angles from the reference line. The process is still hierarchical, fast and accurate. First you must locate the center of each lens image. Thereafter:

1. Find the logo mark on each lens. The logo can be located quickly and reliably in lenses without ink patterns by searching for a large dark region. The search can be carried out either on the lens data in polar coordinates or in the S-matrix of the lens in rectangular coordinates.
2. Select the logo pattern from the first lens image. This selected logo pattern is the template for a refined logo location search for the second lens image.
3. Locate the logo with greater accuracy in the second lens image by doing a pattern match with the logo from the first image. The two logos will now be located to within about 1 pixel on each lens image.
4. The center and reference point on the logo form a reference line on each lens. Construct lines through the center making angles of ±120° with the reference. The intersection of these lines with the lens rim provides two additional points that can be used as geometric match coordinates. A variation is to select the location on the rim provided by extending the reference line until it intersects the rim. This third point would be used in place of the logo coordinate reference.

This search system works well with lenses of both types. The method described for lenses without ink patterns can therefore also be adapted to lenses with ink patterns. It is not required that points in the ink pattern be used to derive the reference points.

Geometric Matching

The implementation herein uses two images gathered by two cameras, which requires a match for each image pair.

The same technique could be used to match more images, but that is not necessary for this system. The image match is carried out under the following assumptions, which are reasonable for contact lens products and the imaging system.

1. The lens behaves as a rigid body so that all points on the lens move together. If the lens were to deform significantly between images then this assumption would be invalid. However, the lens is in a liquid, which provides short-term stable support over a period longer than the 10 seconds or less between images.
2. The lens motion is in a plane. It may rotate and translate in the image plane but the tilt does not change between images. This assumption is reasonable given the geometry of the cuvette, the geometry of the camera system, and the short time between images.
3. Because the images are gathered with different cameras, there is a possibility of different image sizes. Image rescaling is an inherent part of the transformation derived below.

It is commonly known that transformation, rotation and scaling can be accomplished in an image plane by a linear transformation of coordinates. For each point (x, y) in Image 1 we want to find the corresponding point (u, v) in Image 2. The transformation, commonly called an affine transform, can be written as a pair of linear equations.

$$u=ax+by+e$$
$$v=cx+dy+f$$

These equations have six parameters, (a, b, c, d, e, f) whose numerical values must be determined. Once the parameter values have been determined, the equations can be used to map from one image plane to the other.

The six parameters can be determined by finding three matching points on the images. The only requirement is that the points not be on the same straight line. Let A, B, and C be features on the first image and let their coordinates be denoted by $(x_a, y_a)$, $(x_b, y_b)$ and $(x_c, y_c)$ respectively. Let the corresponding features on the second image be A', B' and C' with coordinates $(u_a, v_a)$, $(u_b, v_b)$, and $(u_c, v_c)$. Upon substituting corresponding pairs of coordinates into the u, v equations we obtain six equations. These equations can be solved for the parameter values.

$$a = \frac{u_b x_b - u_c x_b - u_a y_b + u_c y_b + u_a y_c - u_b y_c}{x_b^2 - x_b x_c - x_a y_b + x_c y_b + x_a y_c - x_b y_c}$$

$$b = \frac{u_b x_a - u_c x_a - u_a x_b + u_c x_b + u_a x_c - u_b x_c}{x_b^2 - x_b x_c - x_a y_b + x_c y_b + x_a y_c - x_b y_c}$$

$$c = \frac{-v_b y_a + v_c y_a + v_a y_b - v_c y_b - v_a y_c + v_b y_c}{x_b y_a - x_c y_a - x_a y_b + x_c y_b + x_a y_c - x_b y_c}$$

$$d = \frac{-v_b x_a + v_c x_a + v_a x_b - v_c x_b - v_a x_c + v_b x_c}{-x_b y_a + x_c y_a + x_a y_b - x_c y_b - x_a y_c + x_b y_c}$$

$$e = \frac{u_c x_b^2 - u_b x_b x_c - u_c x_a y_b + u_a x_c y_b + u_b x_a y_c - u_a x_b y_c}{-x_b^2 + x_b x_c + x_a y_b - x_c y_b - x_a y_c + x_b y_c}$$

$$f = \frac{-v_c x_b y_a + v_b x_c y_a + v_c x_a y_b - v_a x_c y_b - v_b x_a y_c + v_a x_b y_c}{x_b y_a - x_c y_a - x_a y_b + x_c y_b + x_a y_c - x_b y_c}$$

Once the parameter values have been calculated, they can be used in the u, v equations to match or register every point on the first image with the corresponding point on the second image.

Comparison of Registered Lenses

The purpose of lens comparison is to remove dark pixels in the image that are not related to actual marks on the lens. This is done quite simply by creating a third resultant lens image in which the value of each pixel is replaced by the maximum value of the pixel in the two matched images. If $L_1$ and $L_2$ are the matched lens images, then L=max $(L_1, L_2)$ is an image in which each pixel is equal to the brightest value at that location in the two images. This process is effective in removing foreign matter from the image if that matter is darker than the true lens value. It is possible that a pixel on a particle of foreign matter will be lighter than a pixel in a lens marking. This would then replace a darker true pixel with one that was somewhat lighter. This has little effect on the analysis of lens defects.

It is important that the lenses be accurately registered so that true dark pixels are matched. If this were not the case, then dark pixels due to scratches or other lens defects would be removed by the comparison process. The size of the defect that could be removed in this manner is closely related to the accuracy of the image match. By matching images to within 1 or 2 pixels, the size of defects that may be eliminated in the comparison process is made sufficiently small to be below the rejection threshold.

The comparison algorithm can be used to "clean" selected regions of the lens rather than the entire lens image. This makes it convenient to combine the comparison step with, for example, the optical zone inspection step. The optical zone is inspected in small blocks that cover the viewing region of the lens. If the region comparison algorithm is used to "clean" only those blocks which the inspection shows to be suspect so they can be reevaluated, then the computation time for comparison can be greatly reduced in exchange for a small increase for reevaluation of suspect regions. This trade-off can greatly reduce the overall inspection time. This is the process that is used in the operational implementation of the system.

Optical Zone Inspection

With reference to FIG. 4a, the optical zone (OZ) 74 is the clear zone in the central area of the lens through which the wearer sees. It is important that this area not have defects. Hence, the OZ is inspected to look for dark areas that would correspond to some kind of defect.

Figures 10, 11:
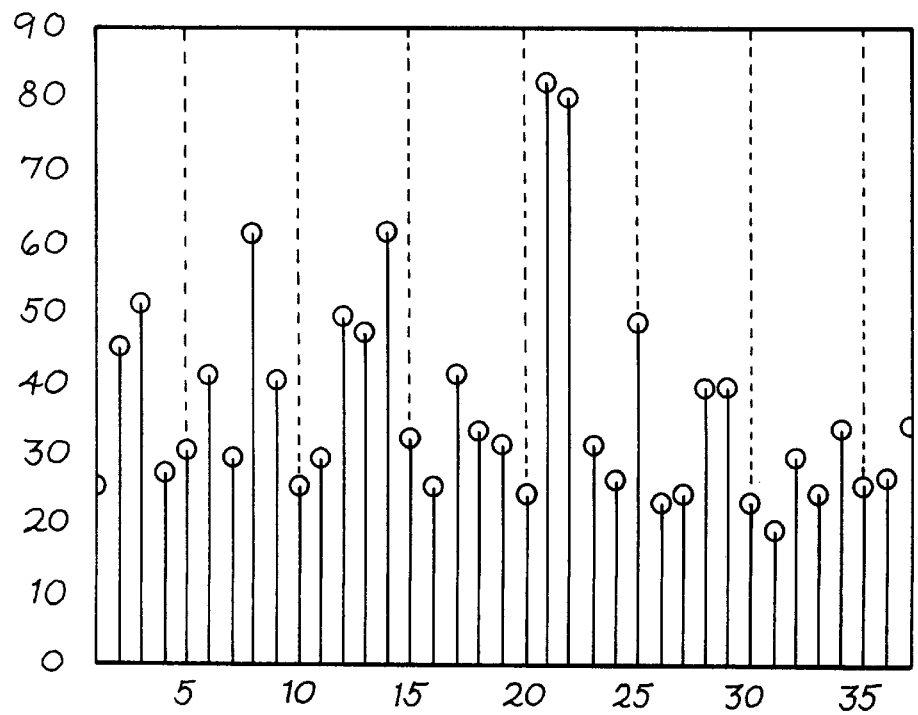
FIG. 10 is a chart that shows the regions defined in the optical zone for detecting dark spots in the zone.
FIG. 11 is a chart that shows the brightness deviation for the regions of the optical zone shown in FIG. 10.

The inspection of the optical zone is carried out by examining small regions that cover the zone in a tiling fashion. The region dimensions are chosen so that the OZ is well covered by the array. Each region is a square of size 34×34=1156 pixels. This size is large enough to contain a good sampling of brightness values. The current implementation uses 37 regions arranged as shown in the table of FIG. 10. Cell c19 is over the center of the lens and those on the outer edges are on the boundary of the optical zone.

Any defect in the optical zone will appear as a dark spot in one or more of the regions. Such defects can be found by evaluating the uniformity of the brightness across each of the 37 regions. Let $B_{avg}(n)$ be the average brightness across region n and let $B_{min}(n)$ be the minimum brightness in region n. Then the difference, $D(n)=B_{avg}(n)-B_{min}(n)$ is a measure of the brightness deviation across that region. Shown in FIG. 11 is a plot of the difference D(n) vs region number for a particular lens. This particular lens has defects in regions 21 and 22 and suspect values in regions 8 and 14.

A criterion for lens rejection based on optical zone defects can make use of a weighted score of deviation values. Let $T_1$ and $T_2$ be threshold values, such as $T_1$=50 and $T_2$=60. Give all cells with $D \leq T_1$ a score of 0, all cells with $T_1 < D < T_2$ a score of 2 and all cells with $D > T_2$ a score of 6. Then reject any lens with a total score of 5 or more. A single bad region or three that are suspicious would produce a rejection. The actual threshold values and scoring are given here as an illustration. The procedure can be modified to obtain measures that correlate well with the decisions made with human inspectors.

The deviation measure $D(n)=B_{avg}(n)-B_{min}(n)$ measures variations in brightness values within a small region of the optical zone. It is therefore not susceptible to variations in illumination that occur across the larger scale of the entire lens. If the illumination variations would significantly affect the computation within a small region, then the inspection system would be completely inoperable. Thus, this algorithm is robust and does not require additional illumination normalization for its satisfactory operation for illumination systems that are even close to normal specifications.

Example Of Artifact Elimination

Figure 12A:
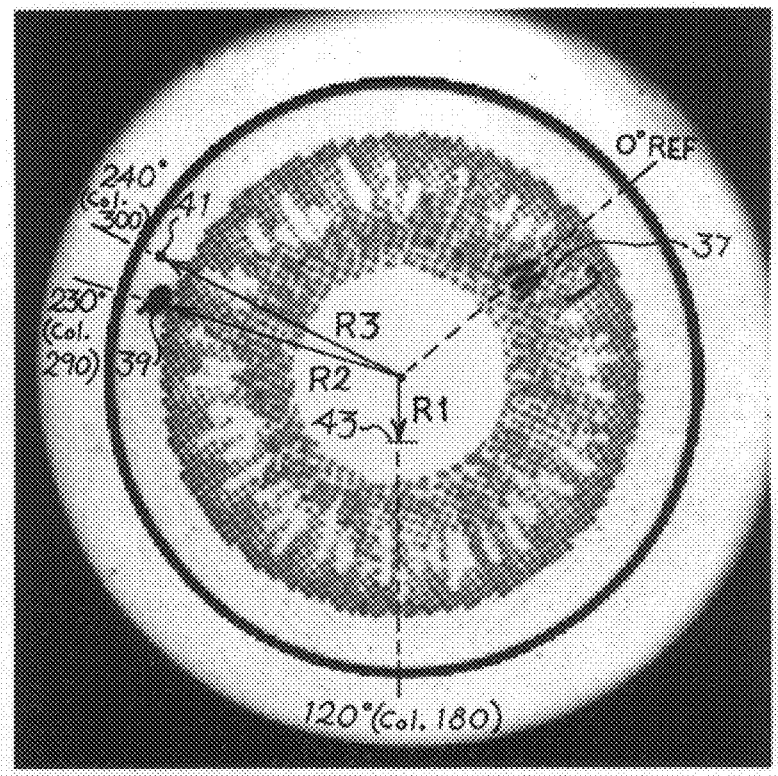
FIG. 12a is an illustration of the first lens image of FIG. 4a showing the polar coordinates of a cuvette scratch, dirt particle, lens spot defect and logo.
Figure 12B:
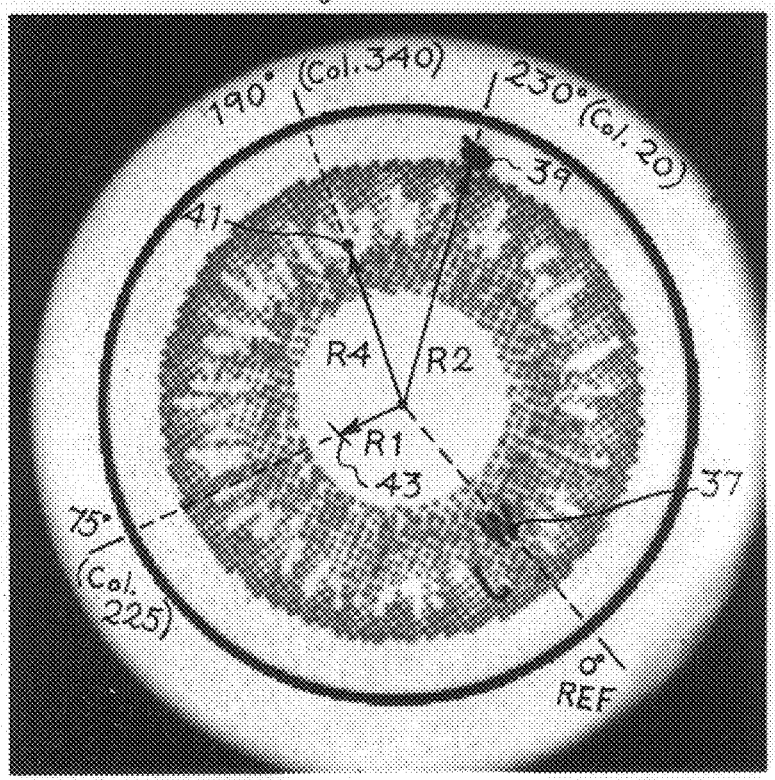
FIG. 12b is an illustration of the second lens image of FIG. 4b showing the polar coordinates of a cuvette scratch, dirt particle, lens spot defect and logo.

The lens inspection system is able to detect real defects in the lens by analytically eliminating the effect of scratches or spots on the cuvette and dirt or other contaminants floating in the saline solution 17. FIGS. 12a and 12b illustrate the lens of FIGS. 4a and 4b and the movement of a spot defect 39 of the lens, a scratch 43 on the cuvette and a floating dirt particle 41 in the saline solution when the cuvette rotates clockwise 45° and the lens rotates clockwise 90° from the first image of FIGS. 4a and 12a to the second image of FIGS. 4b and 12b. For the purpose of this discussion it will be assumed that these spots are one pixel in area. As will be explained in an example hereafter, the automated lens inspection system will ignore the artifacts formed by the floating particle 41 and cuvette scratch 43 and will recognize the spot 39 as a defect of the lens.

FIG. 4a illustrates an example of a first image that is taken at the first camera inspection station 11 for a lens. As shown in FIG. 4a, the image shows dark areas corresponding to the lens spot 39, cuvette scratch 43 and floating particle 41. FIG. 4b shows the second image of the same lens taken at the second camera inspection station 13 after the lens, saline solution and cuvette have been rotated by the cuvette rotation element 45. For the purpose of this discussion, it will be assumed that the cuvette has moved clockwise 45° and the lens has moved 90° clockwise from the first to the second image. This assumed movement is provided only for illustrative purposes. It should be understood that, in practice, any rotational movement will be acceptable. There can also be translational movement between the first and second images. However, for simplicity of illustration and in order to enhance an understanding of the invention, only rotational movement is considered in this example.

With reference to FIGS. 4a, 4b, 12a and 12b, the rotational movement of the lens for the second image with respect to the first image can be seen by the 90° clockwise displacement of the WJ logo 37 that is printed on the lens. This logo is provided to identify the manufacturer, Wessley Jessen, and also to identify a fixed point on the lens that can be used to reference the second image for translation and rotation with respect to the first image.

For the purpose of this analysis, as shown in FIG. 4a, the position of the logo 37 in the first image is 60° from the 0° vertical angular reference of the S-matrix. The logo of FIGS. 4a and 12a is defined as the 0° reference for the first image. The lens of the second image of FIGS. 4b and 12b is rotated 90° clockwise with respect to the first image and the 0° logo reference of the second image is therefore located 150° from the vertical reference of the S-matrix, as shown in FIG. 4b. The logo of FIGS. 4b and 12b is defined as the 0° reference for the second image.

In order to compare the positions of the apparent defects 39, 41 and 43 of the two images, it is necessary to mathematically translate the data of the second image until the lens of this image registers with the lens of the first image. When the images are in registration, the positions of the black spots of each image can be compared and the spots that move, due to movement of the cuvette and the solution relative to the movement of the lens, will be recognized as artifacts that are not defects.

Figure 13:
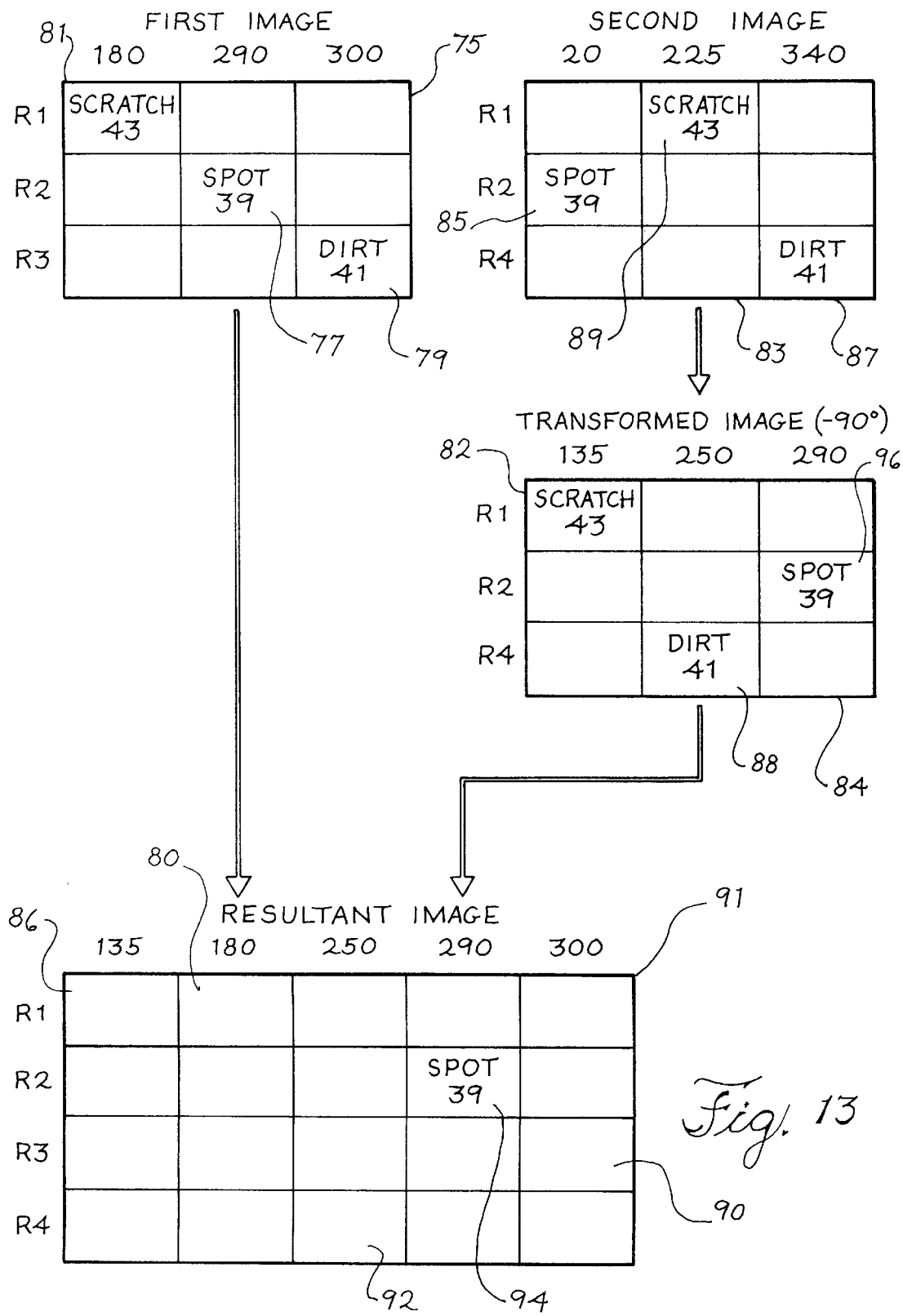
FIG. 13 is a diagrammatic illustration of S-matrices for the two images of FIGS. 4a, 12a and 4b, 12b and the manner that the information of these S-matrices is used to eliminate artifacts and detect real defects of the lens.

As explained previously, in the lens inspection system the translation of the second image with respect to the first image is achieved by an affine transform of the S-matrix data. The S-matrix stores the light intensity values of the images in columns of fixed angle and rows of fixed radius relative to a 0° vertical axis. Thus, as shown in FIG. 13, in the S-matrix 75 for the first image of FIGS. 4a and 12a, the spot 39 on the lens is a dark area with coordinates R2, θ, where R2 is the distance from the center of the image to the spot 39 and θ is the angle of 230° that corresponds to the position of the spot relative to a 0° reference line through the logo 37 of the first image. As shown in the S-matrix 75, the image data for the spot is matrix cell 77 that is located at column 290 and row R2 of the S-matrix for the first image. This column and row correspond to the radial and angular positions of the spot 39 in the first image.

Column 290 corresponds to 290° from the vertical reference of the S-matrix. This angular position corresponds to an angle of 230° (i.e., 290°–60°) relative to the 0° reference position of the logo 37 of the first image. Likewise, the floating dirt particle 41 is located at a cell 79 that corresponds to a radius R3 and an angle θ that is column 300 of the S-matrix and 240° relative to the logo. The scratch 43 on the cuvette is shown in cell 81 that corresponds to a radius R1 and an associated angle θ that is column 180 of the S-matrix and 120° relative to the logo.

With reference to FIGS. 12b and 13, the S-matrix 83 of the second image shows the spot 39 stored at a cell 85 having a radius R2 and an angle θ that is column 20 of the S-matrix and 230° relative to the logo of the second lens image. The spot is a defect of the lens that retains the same radius and relative angular displacement from the logo of both images. The floating dirt particle 41 is located in cell 87 of the second image S-matrix 83 at a radius R4 and an angle θ that is column 340 of this matrix and 190° relative to the logo of the second lens image. This position occurs as a result of clockwise movement of the solution and the particle 41 in the solution. The scratch 43 on the cuvette is located in cell 89 of the second image S-matrix at a radius R1 and an angle θ that is column 225 of the S-matrix and 75° relative to the logo of the second lens image. This angular position corresponds to the assumed 45° clockwise movement of the cuvette relative to the movement of the lens.

The affine transform is applied to the S-matrix 83 so that the 90° movement of the lens is subtracted from the data of the second image in order to rotate this data into registration with the data of the first image. The 90° translation is provided to cancel the 90° clockwise movement of the second image with respect to the first image. The transformed S-matrix 84 of the second image is then compared with the S-matrix 75 of the first image to produce a resultant S-matrix image 91 that reflects only the brightest pixels of the two matrices 75 and 84.

Thus, when the dark cell 81 of the matrix 75 for the first image is compared to the corresponding bright blank cell of the transformed matrix 84, the bright blank cell of the transformed matrix is copied through to the resultant cell 80 of the S-matrix 91. Likewise, the dark cell 82 of the transformed matrix 84 is compared with the corresponding bright blank cell of the matrix 75 and the bright blank cell of the matrix 75 is copied to cell 86 of resultant matrix 91.

The dark spot corresponding to the scratch on the cuvette is therefore ignored. This dark spot is properly ignored because it moved relative to the lens and therefore could not be a defect of the lens.

Likewise, the dark cells 79 and 88 for the dirt particle 41 of the matrices 75 and 84 are compared to their corresponding bright blank cells and the bright blank cells are copied to the cells 90 and 92 of the resultant S-matrix 91. The dark spot of the floating dirt particle 41 is therefore eliminated in the S-matrix 91. This is correct, because the floating particle 41 moved with respect to the lens and therefore is not a defect of the lens.

The only black spot that passes to the resultant S-matrix 91 is the spot 39 that is a fixed defect of the lens. This spot is copied to cell 94 of the matrix 91 because the dark cell 77 of the matrix 75 of the first image matches the dark cell 96 at the same R, θ position in the transformed S-matrix 84. FIG. 13 therefore demonstrates the method whereby contaminates in solution and scratches on the cuvette are eliminated in the automated process of lens inspection. The resultant S-matrix contains only dark spots that correspond to defects of the lens. If any such spots are located in the optical zone, they are detected as defects by analyzing tiled regions as previously described.

Ink Pattern Inspection

The printed iris ink pattern of the lens can be inspected with a set of data that can easily be gathered once the center of the lens has been found. This data set is an array of image brightness values along radial lines at regular angle intervals around the compass of the lens. The brightness values along each radial line are stored in the S-matrix. As explained previously, the S-matrix columns contain the values along a path of constant angle and the rows contain the values along a path of constant radius. The iris portion of the S-matrix represents a picture of the brightness values within a region bounded by radii $r_1$ and $r_2$ and angles $\theta_1$ and $\theta_2$, but displayed on a rectangular row and column format. In this analysis $r_1$ and $r_2$ are respectively selected as the inner and outer radius of the iris print zone. The angles $\theta_1$ and $\theta_2$ are selected to cover the entire circle from 0 to 360 degrees.

This description of the S-matrix assumes that the radial paths cross a circular path centered on the lens center. A more sophisticated version of the algorithm can use an elliptical or polynomial generated path that models the shape of the lens.

The size of the S-matrix is M×N, where M is the number of points taken along a path of constant angle and N is the number of angles. Experimentation can be done with the best size for S. The trade-off is between more detail and more processing time. Since the purpose is to find fairly large blank areas in the ink pattern, it is not necessary to use a large number of points in S. The best size to use can be determined empirically.

Figure 14:
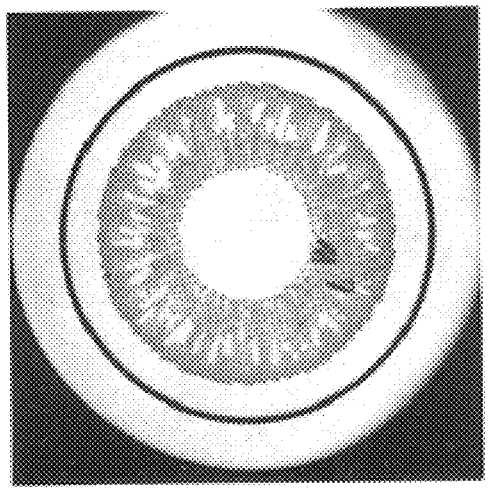
FIG. 14 illustrates an image of a lens with an iris ink pattern and a printed logo.
Figure 15:
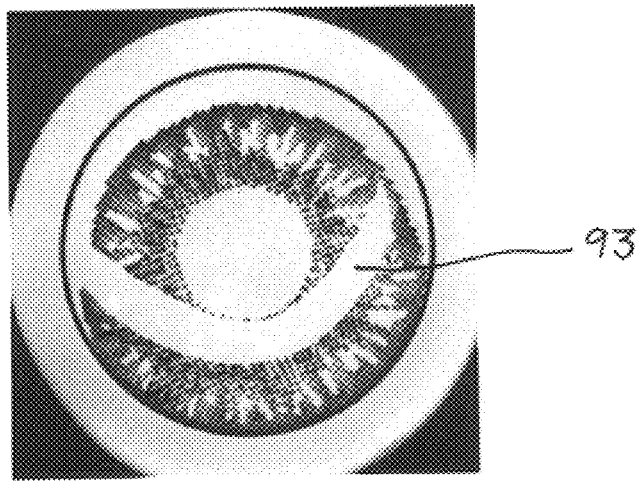
FIG. 15 illustrates an image of a lens that has a large defect in the iris printed area.
Figure 16:
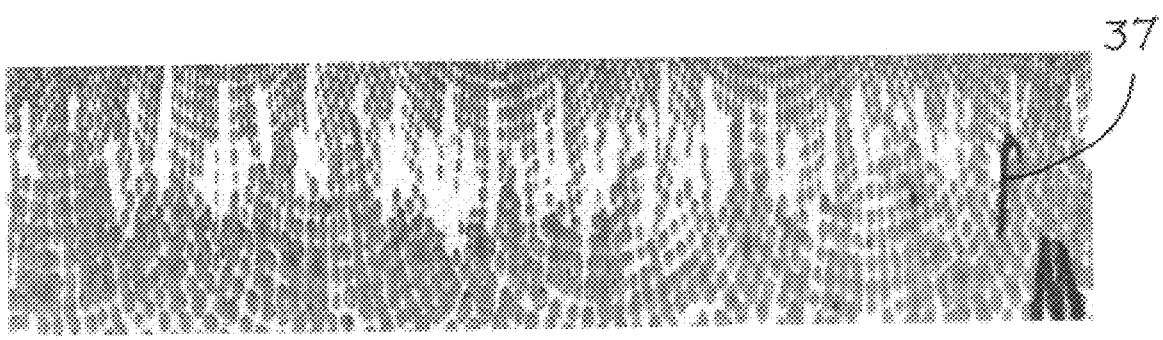
FIG. 16 illustrates an S-matrix representation of the light intensity information for the lens of FIG. 14.

An image of a lens is reproduced in FIG. 14. This lens has a number of medium size gaps in the printed area, but this is a part of the pattern design. This ink pattern is acceptable. In contrast, the lens of FIG. 15 has a large unprinted region 93 running through the printed area. This lens should clearly be rejected. FIG. 16 shows an S-matrix gathered from the lens of FIG. 14 using 600 angles (about every 0.6 degree) and 150 radial steps. Clearly the information for print zone quality is preserved in this S-matrix.

The contrast between the bright areas and the ink pattern can be enhanced by a standard contrast enhancement procedure. This procedure consists of applying a point function u=f(s) to each element "s" of the array in such a way that the gray levels are spread more evenly over the total range of brightness values. However, this process takes time, with at least one multiplication per element of the S-matrix, and does not accomplish anything useful toward the goal of detecting bright areas. Such a process is useful to match the image of S with a detector such as the human visual system, but is not useful in an automated detection process where one can tailor the detector to the image. Instead, we use a process of threshold detection as described below.

Threshold detection can be used to differentiate pixels that have bright values from others that do not. Let a threshold function be defined by u=f(s), where $$f(s) = \begin{matrix} 1, s \geq T \\ 0, s < T \end{matrix}$$

Figure 17:
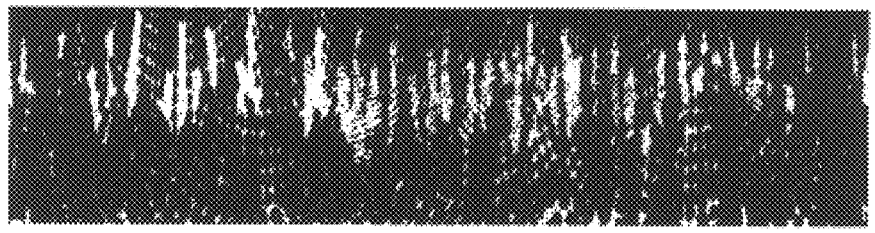
FIG. 17 illustrates a contrast enhanced version of the S-matrix lens data of FIG. 16.
Figure 18:
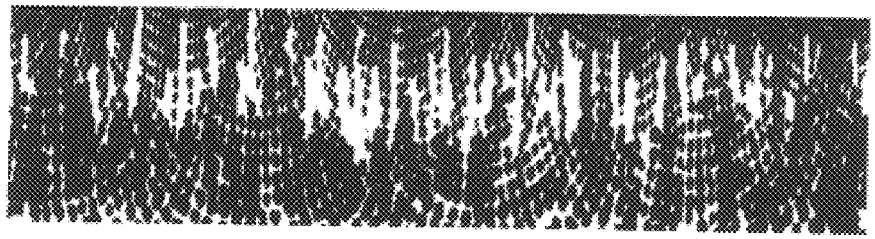
FIG. 18 shows another contrast enhanced version of the S-matrix lens data of FIG. 16.
Figure 19:
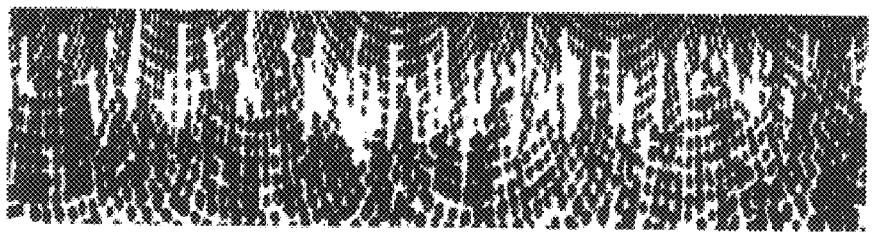
FIG. 19 shows another contrast enhanced version of the S-matrix lens data of FIG. 16.
Figure 20:
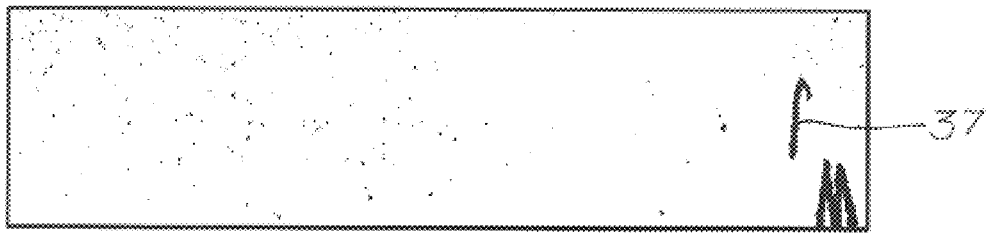
FIG. 20 shows another contrast enhanced version of the S-matrix lens data of FIG. 16.

As a matter of implementation, the U-matrix is scaled so that 0 is the minimum (black) and 1 is the maximum (white). Applying the threshold function to S will produce a new array, say U, in which all of the values are either 0 or 1. A region of S that has a large number of bright areas will appear in U as a cluster of ones. The U-matrix for the S-matrix of FIG. 16 is shown in FIGS. 17–20 for different threshold settings. FIG. 17 shows a U-matrix constructed with T=235 on a brightness scale of (0,255). FIG. 18 shows a U-matrix constructed with T=215. FIG. 19 shows a U-matrix constructed with T=200 and FIG. 20 shows a U-matrix constructed with T=150.

The choice of the threshold is important, but not particularly sensitive. It should be between the highest gray level of a printed pixel and the brightness value of an unprinted pixel. There is a range of values that can be used for the threshold T. With reference to the brightness S-matrix histogram of FIG. 21, we see that the threshold could be anywhere in the range 200 to 235. Note that using a low value of T=150 drops out all but the darkest regions, as shown in FIG. 20. This is useful for an operation that searches for the logo in the print pattern, but it would not be useful in searching for gaps in printing. The value of T can be set automatically in an operational system by measuring the average brightness over the optical zone for several lenses in sequence. If you set the threshold just on the current lens, then a cloudy OZ may lead to a value that is too low for T. T should be set to be about 20 brightness steps lower than the average. As an example, the average brightness in the center zone of the lens could be 242, which would place a threshold at 222. Using this automated technique will ensure that the printing will be lower than T and will appear black in the U-matrix. Automatic setting of T is recommended for robust operation.

Figure 21:
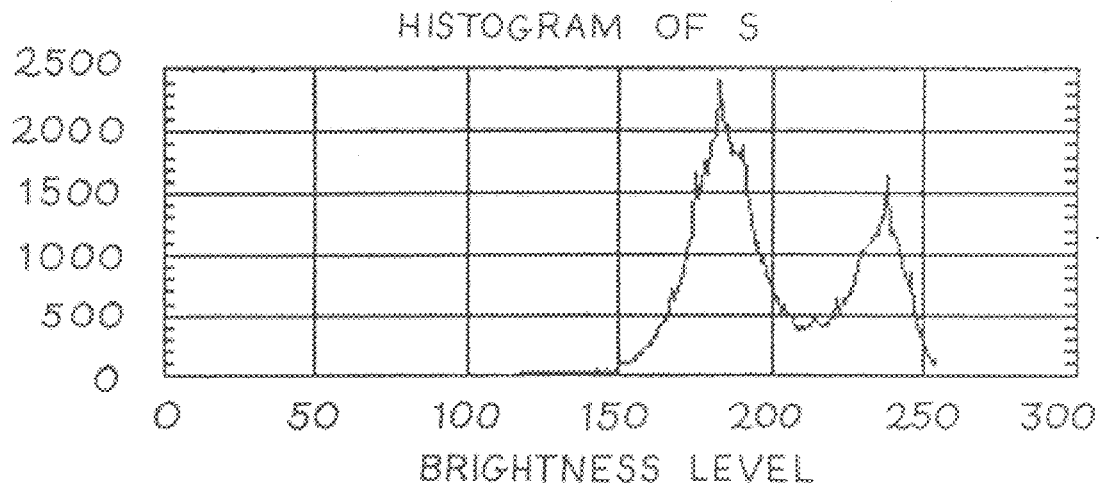
FIG. 21 shows a chart of brightness levels for an image of a lens with different contrast thresholds.

The range of possible threshold values can be verified by examining the brightness histogram, an example of which is shown in FIG. 21. The printed and unprinted pixels are clearly separated into two brightness regions on either side of the minimum at approximately 215.

We can conduct a search for bright areas by summing over a rectangular region that is stepped over the array U. One would expect the sum to be large in bright areas and small in other areas. The size of the block should be approximately the size of the smallest bright area in a printed zone that would lead to a rejection. The step size is a trade-off between efficiency and the need to be sure that the window steps within the bright area.

Figure 22:
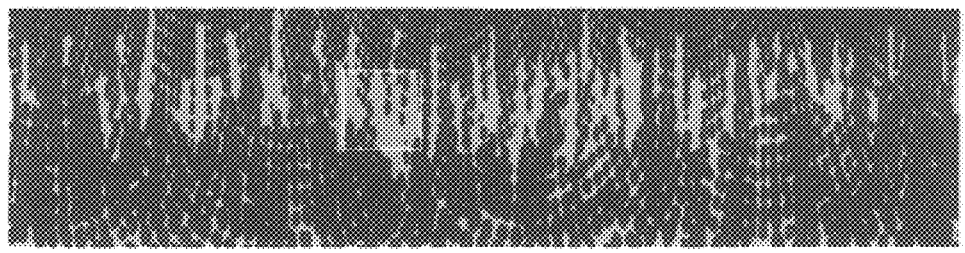
FIG. 22 shows contrast enhanced S-matrix information in association with a scanning inspection box.

Let A be a matrix in which A(i,j) is the sum of the values of U within the block located at position (i,j). Then A will have a large value when the block is over a bright area and a small value when it is over a dark area. A surface plot of A for a block size of 50×50 and a step size of 10 in each direction has a peak at column 21 and row 6. The corresponding U matrix with the block located by this peak is highlighted in FIG. 22. Note that the 50×50 block roughly covers the bright zone in the printed area.

Figure 23:
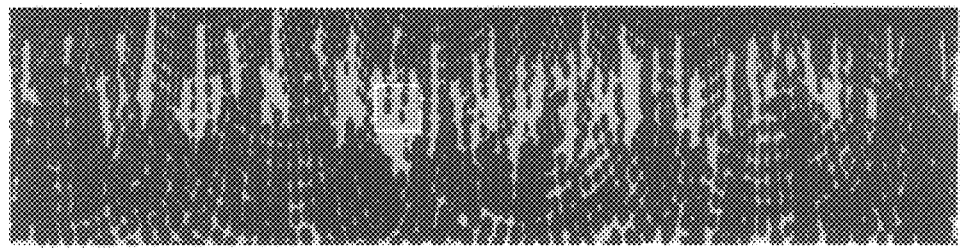
FIG. 23 illustrates another contrast enhanced S-matrix with a 30 by 30 scanning inspection box.
Figure 24:
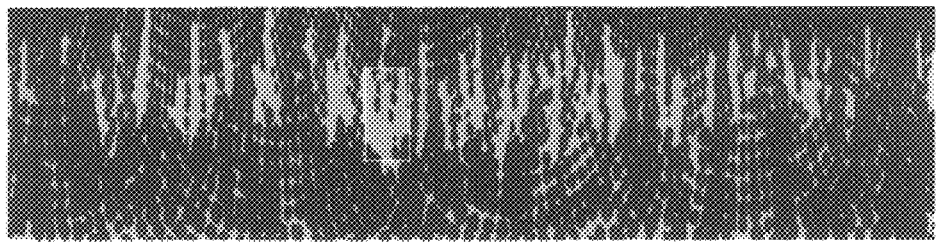
FIG. 24 illustrates another contrast enhanced S-matrix with a 60 by 30 scanning inspection box.

FIGS. 23 and 24 respectively show the location of a bright area using a search box of 30×30 and 60×30. It is remarkable that the same region is located regardless of the size of the search box. We want to accept these printing gaps because they are part of the pattern design. Hence, the size of the inspection box must be substantially larger than 60×60.

Figure 25:
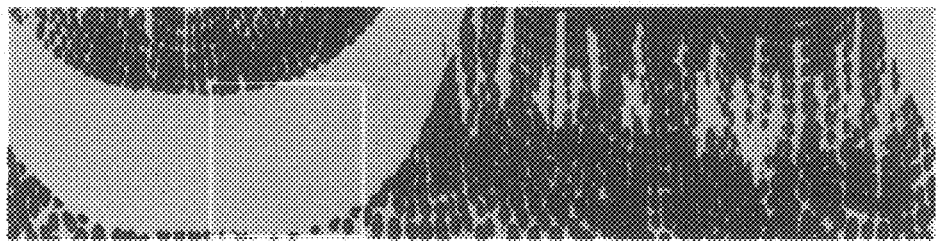
FIG. 25 illustrates another contrast enhanced S-matrix with a 100 by 100 scanning inspection box.

To look for larger problems in the print area it is necessary to increase the size of the inspection box. An example is shown in FIG. 25. Here we see that an inspection box of size 100×100 fits within the unprinted area. This provides an indication of the size to be chosen for the inspection box.

The analysis program has the following components:
1. Select the rows of the S-matrix that correspond to the printed area. The selected rows should cover the printed area but not pick up the bright area in the optical zone and outside the printed area.
2. Construct a matrix U that is a thresholded version of S. The threshold should be about 20 brightness steps below the average brightness in the optical zone.
3. Scan the U-matrix with an inspection box that is about the same size as the gaps in the printed zone that you want to detect.
4. Reject the lens if any of the boxes have a sum that is greater than an acceptable threshold. This threshold should be about 80% of the size of the scanning box.

Logo Inspection

The purpose of logo inspection is to determine that the logo has been properly printed on the lens. The logo is used by the wearer to determine the lens orientation. If the logo is misprinted to the extent that it cannot be read or is badly mislocated then it does not serve that function. Furthermore, a poorly printed logo is an indication to the customer of a poorly controlled production process and a reason to reduce respect for the product. For these reasons it is necessary to inspect the logo and to determine that it has acceptable quality.

Figure 26:
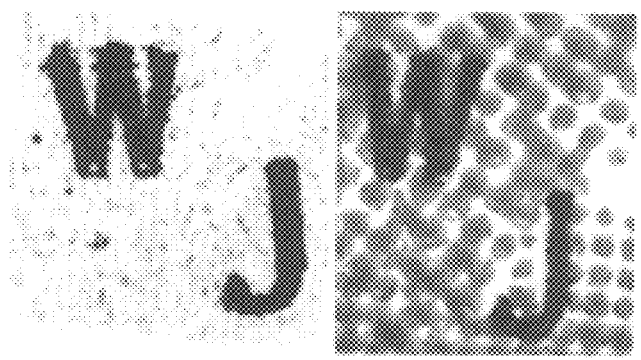
FIG. 26 illustrates the Wessley Jessen WJ logo for a clear lens and a color printed lens.
Figure 27A:
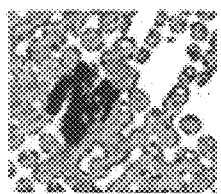
FIGS. 27a–e illustrate magnified views of defective portions of the Wessley Jessen logo.
Figure 27B:
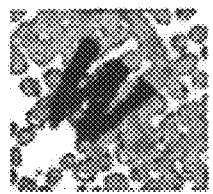
Figure 27C:
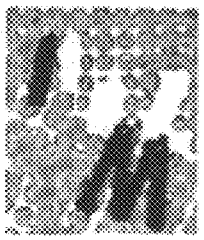
Figure 27D:
Figure 27E:
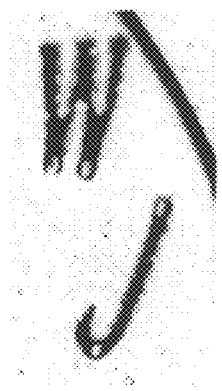
Figure 28A:
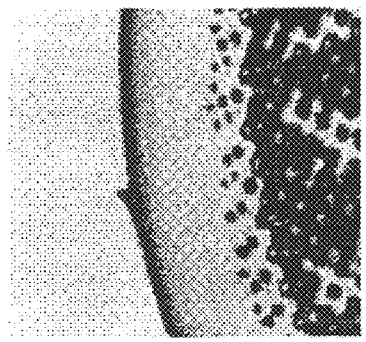
FIGS. 28a–d illustrate examples of defects on the rim of a contact lens.
Figure 28B:
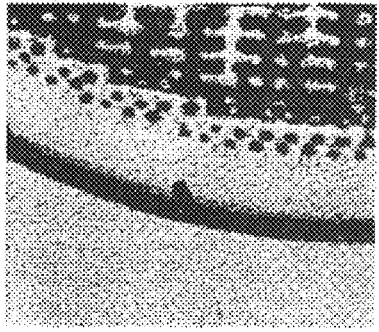
Figure 28C:
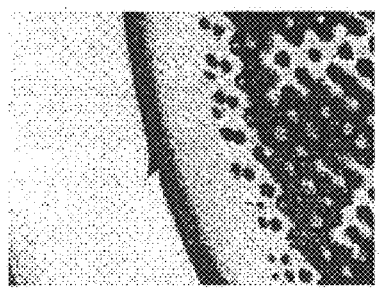
Figure 28D:
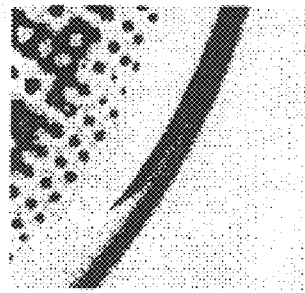
Figure 29:
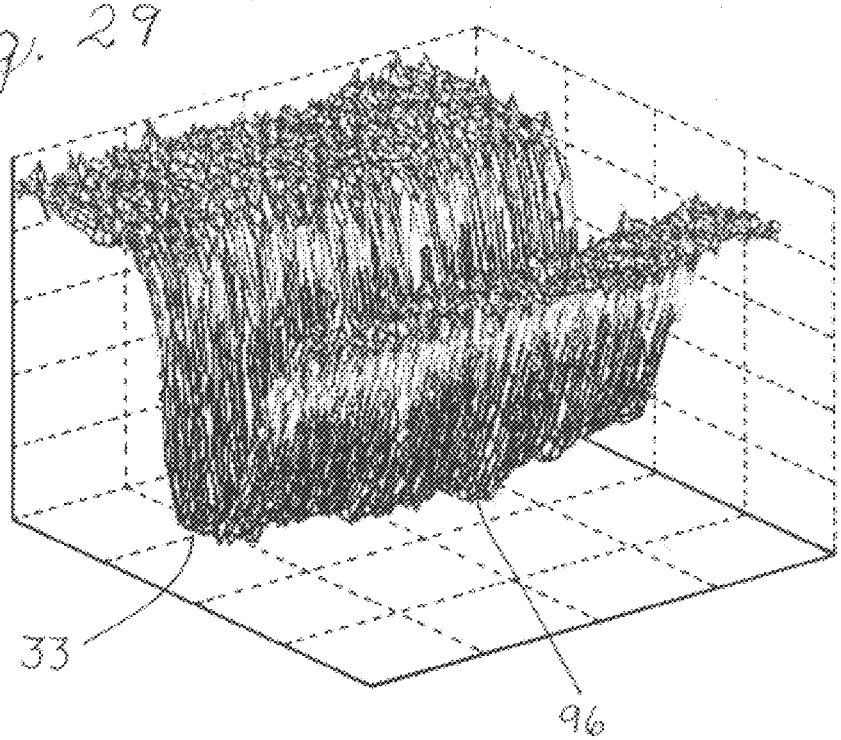
FIG. 29 illustrates a chart of a surface plot of the values of an S-matrix that contains a portion of the rim that has a defect.

An example lens logo is made of the initials, W and J, offset from each other. This is shown in FIG. 26 where the logo on the left is from a clear lens and the one on the right is from a lens with a colored printed pattern. It is necessary to be able to locate and inspect the logo on either type of lens.

The major challenge in logo inspection is in determining whether the logo has the correct structure. It is not difficult to construct a process to locate a region with a large dark object against a lighter background. It is more difficult to analyze the structure of the dark region to determine that it is in an acceptable form for the logo. Some examples of misformed logos are shown in FIGS. 27(a)–(e). Examples (a), (b), (d), (e) have defects which would cause rejection. Example (c) is borderline acceptable because the wearer could determine the orientation from the relative location of the two parts.

One could set about creating a logo inspection algorithm by constructing a process to recognize the letters W and J. Once letters had been located and recognized, their relative placement could be measured. If they were not recognized or if the placement was incorrect then the lens would not pass inspection. The algorithm that is described below essentially follows this process, but without employing a general recognition tool. Because there are only two patterns to be evaluated, a relatively simple structured geometrical approach can be used effectively.

The steps in the algorithm are listed below. Note that the step of locating the lens and constructing the S-matrix will be done elsewhere in an integrated inspection system, but is listed here for completeness.

1. Locate the lens in the image and construct the S-matrix.
2. Construct a matrix U by applying a brightness threshold to the elements of S. The purpose is to separate the dark logo pixels from the background printed pixels on the basis of brightness. (The threshold can be adjusted dynamically in an automatic system.)
3. Locate the column range of U that contains the logo. This corresponds to finding the angular sector of the lens that contains the logo. Select that column range of U to form a reduced matrix A.
4. Select the largest contiguous set of dark pixels in A as the W section. Calculate the corners and center of a box that contains W.
5. Select the second largest contiguous set of dark pixels in A as the J section. Calculate the corners and center of a box that contains J.
6. Evaluate the geometric relationships provided by the W and J boxes relative to acceptance specifications.

The geometric comparisons are based on five parameters that are computed from the W and J box coordinates:

1. Distance D between center of W box and center of J box. Must fall in the interval DWJMIN<D<DWJMAX.
2. Angular dimension DWA (width) of W box. Must fall in the interval DWAMIN<DWA<DWAMAX.
3. Radial dimension DWR (height) of W box. Must fall in the interval DWRMIN<DWR<DWRMAX.
4. Angular dimension DJA (width) of J box. Must fall in the interval DJAMIN<DJA<DJAMAX.
5. Radial dimension DJR (height) of J box. Must fall in the interval DJRMIN<DJR<DJRMAX.
6. Aspect ratio WA=DWR/DWA of W box. Must fall in the interval WAMIN<WA<WAMAX.
7. Aspect ratio JA=DJR/DJA of J box. Must fall in the interval JAMIN<JA<JAMAX.
8. Area AW=DWA X DWR of W box. Must fall in the interval AWMIN<AW<AWMAX.
9. Area AJ=DJA X DJR of J box. Must fall in the interval AJMIN <AJ<AJMAX.
10. The center WC of the W must be within the radial limits for the logo location. WCMIN<WC<WCMAX.

These ten tests must all be passed for the logo test to be passed. Each test involves a pair of parameters that define the endpoints of an acceptance interval. The twenty values determine the acceptance criteria, and must be established from the specifications of the logo letters and the desired location on the lens. Experience with this inspection process has shown that it is fast and an effective inspection screen for the logo quality.

It would be possible to gather statistical information on the eight computed parameters D, DWR, DJA, WA, JA, AW, AJ, WC. Tracking of these parameters during the production process would provide an in-line indication of problems in the printing process and possibly enable remedial action before the process went out of tolerance.

Edge Inspection

The edge of lenses must be smooth and continuous. Edge defects include nicks, cuts, chops and adhering foreign matter. The nicks that occur on edges can be so small that they are almost invisible except under high magnification. FIGS. 28(a)–(d) show examples of edge defects on the rim of the contact lens that must be detected and rejected.

The automated inspection of the edge of the lens requires extensive modeling. The edge inspection relies on an analysis of profile cuts across the edge image, which are constructed on the basis of a geometric model of the edge. The edge model can be either from ellipse parameters or from a polynomial fit of the edge in the inspection matrix. The polynomial fit is preferred.

The process of edge inspection is essentially one of searching for rapid variations in the profile of the edge. The profile of the edge can be seen in the S-matrix as a dark line that is nearly horizontal across the matrix. FIG. 7 shows an example of such a profile 33.

Figure 30:
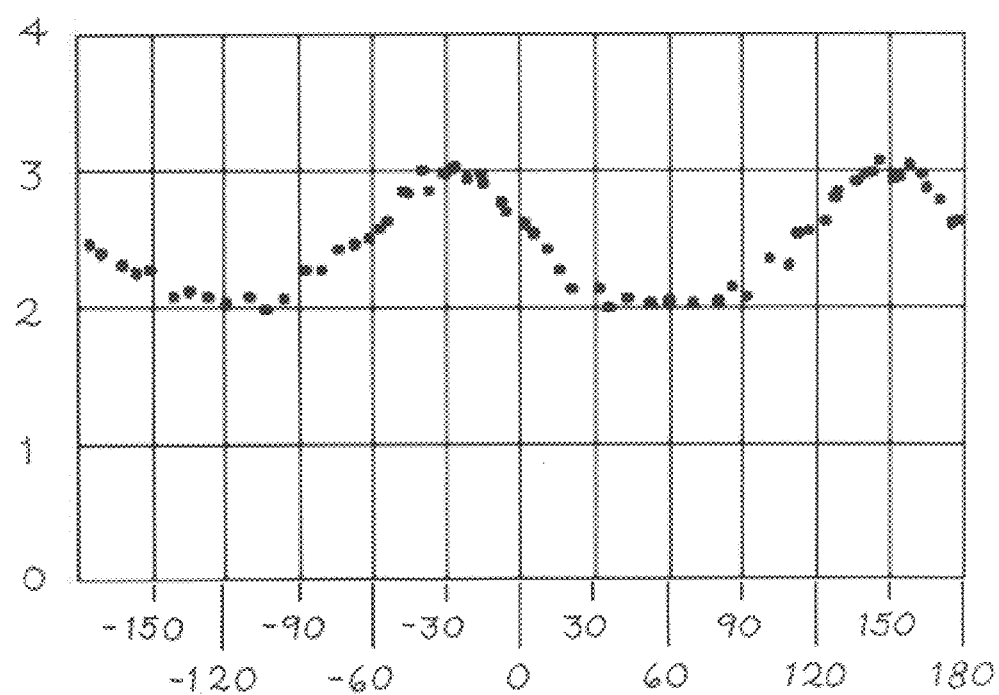
FIG. 30 is a chart that illustrates a plot of radius and angle for points in the S-matrix data set at the edge of a lens.

The profile of a small section of an S-matrix along a portion of a lens edge that contains a defect is shown in FIG. 30. The rim of the lens 33 appears as a deep long trench in this surface plot. The bottom of the trench corresponds to the darkest part of the rim. The defect is visible in the surface plot as a bump 96 on the side of the trench. The inspection algorithm can detect such a defect by finding short-range variations in the edge profile.

An inspection process that can locate defects by analyzing the rim profile in the S-matrix is outlined below. There are many possible variations in this process, and each variation has its own adjustment parameters which can be set by a variety of means, either automatically or manually.

1. Locate the center of the lens and construct the inspection S-matrix. The radial profile lines must extend across the rim of the lens.
2. Locate the band of matrix rows that contain the rim. This can be done in many ways, given the prominence of the dark band.
3. Use a comparison metric to compare the value of a profile in column k with a model. The model may be static or it may be constructed by using a subset of the edge profile in the S-matrix. This comparison may be either simple or complex, adjusting for changes in the location of the minimum point and profile depth, for example. The result of each comparison is a set of one or more numbers for each column that describe how well that edge profile compares to the model.
4. Locate those profiles whose variation from the model makes them suspect.
5. Optionally, perform additional analysis in the region of the suspect profiles.
6. Conduct a matching edge analysis on the second of a pair of lens images.
7. Compare the locations of suspect edge points. If the suspect points on the two images do not match to within a given tolerance in location, then assume that the effect was caused by a moving (foreign) object. If the locations do compare then assume that it is a defect on the edge of the lens.

This inspection algorithm can be used in a single image system. In that case it will detect edge defects but is vulnerable to false rejection of lenses due to foreign matter in the image. It is preferred to use this algorithm with two images and to compare the defects that are detected. If a dark spot is detected in the same edge area of both images, it is recognized as a lens defect.

Polynomial Edge Fitting

Edge defects are detected in a preferred embodiment by comparing the edge data to a mathematical model of the edge. A preferred method of edge modeling is to fit the data points in the polar coordinate representation with polynomials and then combine the polynomial representations. The basic approach can be described by looking at a plot of $p_i$ vs. $\beta_i$, such as FIG. 30. If the data is grouped into four sections corresponding to the angle intervals (0°,90°), (90°,180°), (180°,270°), (270°,360°) then polynomial approximations to $\rho$ vs. $\beta$ can be calculated for each section. The sections do not have to be exactly as described here, nor even be contiguous for this approach to be used. One variation is to permit some overlap in the data sets, which facilitates interpolation of values at the set boundaries.

Let the data sets be denoted by $S_i$, $1 \leq i \leq n$, where n is the number of data sets. Let a polynomial $f_i(\beta)$ be defined on the points in $S_i$, such that the sum of the squared differences $$\varepsilon_i = \sum_j [p_j - f_i(\beta)]^2$$

is minimized. The coefficients of such a polynomial can be derived by standard techniques. If the polynomials are chosen to have the same degree, p, then they can be written in the form $$f_i(\beta) = c_{i0} + c_{i1}\beta + c_{i2}\beta^2 \ldots + c_{ip}\beta^p, \quad 1 \leq i \leq n$$

A model of the rim of the lens is provided by this set of polynomials because the radius can be calculated for any angle. Given a value of $\beta$, choose the region in which it falls. Then calculate the radius using the appropriate polynomial function. If the angle falls near the boundary, calculate the radius at angles near the boundary in the adjoining regions and interpolate the radius.

Care must be taken to use the polynomial expressions only in the regions for which they were calculated. Polynomial approximations are notoriously inaccurate outside their region of definition. By allowing overlap in the regions, it is possible to reduce this edge effect.

Polynomial modeling has an advantage over ellipse modeling in dealing with lenses that are somewhat distorted. This is the case, for example, in the inspection of partially hydrated lenses. In such cases the elliptical fit may be poor and lead to lens rejection in the inspection process, whereas the polynomial method is better able to adapt to smooth variations in the edge contour.

The number of terms used in the polynomial fit depends upon the amount of data that is available and the rate of change of the data. In general, one should not use a degree higher than about ⅓ of the data points that are used in calculating the coefficients. In practice, a 10th order polynomial has been successfully used, although lesser or greater degree polynomials could be used.

After a model for the edge of a lens has been calculated, it is possible to go back and refine the edge point data set. This can be done by calculating the distance from each point in the set to the boundary and then rejecting those points that fall beyond a specified distance. The reduced data set can then be used to create a new estimate of the parameters of the model. The refinement process is necessary in any environment where artifacts are likely. Artifacts have many causes, including scratches on the cuvette and dirt in the cuvette fluid. These artifacts are not removed in the dark rim region by the previously described "cleaning" process. One refinement step should be used routinely. The refinement process can be used with either the elliptical or polynomial methods, and, indeed, with any other modeling approach.

Once a rim model is available it can be used to locate model points at any angle around the center. The efficiency of the process can often be improved by using a look-up table. The look-up table is calculated once and then used for all future calculations. If a value is needed that is not in the table, it can be interpolated from the nearest table. The system has been implemented with a look-up table of 720 points at ½ degree angles around the lens edge. The radius at any other point is interpolated.

Ellipse Edge Fitting

Although polynomial edge fitting is preferred, an ellipse could also be used to model the edge. Alternatively, elliptical modeling has been used as an initial approximation to roughly locate the area of the rim data of the lens. A polynomial is thereafter used to model the data. An ellipse representation of the circular lens is useful because it approximates the appearance of the lens when it is tilted relative to the viewing angle. Moreover, the lens may actually be slightly elliptical because of variations in the manufacturing process.

The edge finding algorithm provides a set points that fall approximately on the lens edge. A variety of practical limitations to the imaging and edgefinding process will cause a noisy variation in the location of the edge points. Furthermore, a number of points will be found that are not even near the edge. The edge modeling algorithm must deal with all the randomness of the edge data and still produce a good representation of the boundary. An ellipse model should allow for a reasonable variation in imaging and the manufacturing process and should provide a good, compact, parametric model.

An ellipse may be described by five parameters, namely, the center coordinates $(C_x, C_y)$, the lengths of the major and minor axes, a and b, and the angle $\phi$ of the major axis from the horizontal axis. The simplest case is when the center is at the origin of the coordinate system and the major axis is in the horizontal direction. A point (x, y) on the ellipse has coordinate values that are related by $$x = a \cos\theta$$
$$y = b \sin\theta$$

where $\theta$ is an angular parameter. The distance from the center to the point (x, y) is given by the Euclidean distance formula $$\text{Equation E1}: \quad d = \sqrt{x^2 + x^2} = \sqrt{a^2\cos^2\theta + b^2\sin^2\theta}$$

and the angle that a line from the point (x, y) to the center makes with the horizontal axis is $$\alpha = \tan^{-1}\left[\frac{y}{x}\right] = \tan^{-1}\left[\frac{b\sin\theta}{a\cos\theta}\right]$$

The angle $\alpha$ equals the angular parameter $\theta$ only when the major and minor axes have the same length.

Any geometric figure can be rotated about the origin of the coordinate system by a coordinate transformation. In effect, we leave the figure still and rotate the axes of the coordinate system. Let (x, y) be the location of a point P in one coordinate system and (u, v) be the location of the same point P in the rotated system. Let the two coordinate systems have the same origin, but have the axes rotated by an angle $\phi$. Then the coordinates of P in the two systems are related by $$u = x\cos\phi + y\sin\phi$$
$$v = -x\sin\phi + x\cos\phi \quad \text{Equation E2:}$$

The same information can be expressed in matrix form as $$\begin{bmatrix} u \\ v \end{bmatrix} = \begin{bmatrix} \cos\phi & \sin\phi \\ -\sin\phi & \cos\phi \end{bmatrix} \begin{bmatrix} x \\ y \end{bmatrix}$$

The origin of an ellipse can be shifted simply by adding the shift value to each coordinate. The equation of a rotated ellipse located at $(C_x, C_y)$ is $$u = C_x + a\cos\theta\cos\phi + b\sin\theta\sin\phi$$
$$v = C_y - a\cos\theta\sin\phi + b\sin\theta\cos\phi$$

In this analysis we will assume that the center of the figure has been located by the centering algorithm, and that it is only necessary to find values for the three parameters {a, b, $\phi$}.

The observed data is a set of points $(u_i, v_i)$, $1 \leq i \leq n$. Most of these will fall on or near the edge of the lens, but some will fall far from the edge. Our goal is to fit an ellipse to the observed data using the good points and eliminating the outlier points that are not on the edge. We must find the major and minor axis lengths and the angle of rotation.

The usual method for determining parametric values from data is statistical estimation. In this case, the parameters (a, b, $\phi$) are related in a nonlinear fashion to the set of points $(u_i, v_i)$, $1 \leq i \leq n$. The parameter values must be determined in a real-time production process under difficult time constraints. It is therefore necessary to consider transformations of the points that will simplify the estimation process.

The distance of a point (u, v) on an ellipse to the origin is given by $$\text{Equation E3}: \quad R = \sqrt{u^2 + v^2}$$

The angle that a line from the point to the center makes with the horizontal axis is $$\beta = \tan^{-1}\left[\frac{v}{u}\right]$$

We can calculate the values of radius and angle for each point in a data set. This amounts to a transformation from rectangular to polar coordinates: $(u_i, v_i), \rightarrow (R_i, \beta_i), 1 \leq i \leq n$.

It is not a good practice to estimate parameter values from individual data points, such as the location of extreme values. Such estimates are vulnerable to noise and data outliers. An estimate should make use of all of the information available from the full set of data points. Thus, we will proceed to develop some analytical tools to use all of the values.

It can be shown from Equation E2 that $u^2 + v^2 = x^2 + y^2$ where (x, y) would be the point corresponding to (u, v) on an ellipse with major axis in the horizontal direction. From Equation E1 we then see that $$R^2 = a^2\cos^2\theta + b^2\sin^2\theta$$

By substituting the trigonometric identities $$\cos^2\theta = \frac{1}{2} + \frac{1}{2}\cos 2\theta$$

-continued $$\sin^2\theta = \frac{1}{2} - \frac{1}{2}\cos 2\theta$$

we can write the above as $$R^2 = \frac{a^2+b^2}{2} + \frac{a^2-b^2}{2}\cos 2\theta$$

This indicates that the average value of $R^2$ and the amplitude of the variation of $R^2$ should be important in determining the value of the parameters (a,b). Therefore, we define the intermediate parameters Equation 4: 
$$C = \frac{a^2+b^2}{2}$$
$$M = \frac{a^2-b^2}{2}$$

which correspond to the average value and the amplitude of $R^2$. We know from the definition of R given in Equation E3 that we can calculate the values of $R_i^2$ for each data point $(u_i, v_i)$. If we can use the values of $R_i^2$ to calculate the values of the parameters C and M, then we can find a and b from $$a = \sqrt{C+M}$$
$$b = \sqrt{C-M}$$

The angle $\phi$ corresponds to the phase angle of a sinusoid that is fitted to a plot of the radius $R_i$ against angle $\beta_i$ for the edge points that lie on or near the elliptical contour of the contact lens. We note that the plot of $R^2$ vs $\beta$ goes through two full cycles over the range $-180 \leq \beta \leq 180°$. Thus, we fit the data with a curve of the form $$f_i = C_1 \cos 2\beta_i + C_2 \sin 2\beta_i + C_3 \qquad \text{Equation 5:}$$

where $f_i$ is a value that would be calculated by substituting $\beta_i$ into the equation. We want to choose the values of the coefficients so that the fit of $f_i$ to the actual value $p_i = u_i^2 + v_i^2$ is as close as possible.

If the values of the coefficients $\{C_1, C_2, C_3\}$ can be found from the data, then the ellipse parameters can be found. The needed relationships can be found by expressing Equation 5 in terms of a constant term and a single sinusoid.

$$f_i = \sqrt{C_1^2+C_2^2}\left(\frac{C_1}{\sqrt{C_1^2+C_2^2}}\cos 2\beta_i + \frac{C_2}{\sqrt{C_1^2+C_2^2}}\sin 2\beta_i\right) + C_3$$

This can be put into an amplitude-angle form by defining $$A = \sqrt{C_1^2+C_2^2}$$
$$\cos 2\gamma = \frac{C_1}{\sqrt{C_1^2+C_2^2}}$$
$$\sin 2\gamma = \frac{C_2}{\sqrt{C_1^2+C_2^2}}$$

Then $$f_i = A\cos[2(\beta_i - \gamma)] + C_3$$

We can now relate the parameters of this equation to those of the plot of radius $R_i$ against angle $\beta_i$. The amplitude A corresponds to the amplitude M, and $C_3$ corresponds to C of Equation 4. Furthermore, $\gamma$ is the angle at which the function reaches its maximum amplitude, and therefore is equal to the angle of rotation, $\phi$. That means we can calculate all of the parameters $\{a, b, \phi\}$ if we can find the values of $\{C_1, C_2, C_3\}$. Explicitly, Equation 6: 
$$a = \sqrt{C_3 + \sqrt{C_1^2+C_2^2}}$$
$$b = \sqrt{C_3 - \sqrt{C_1^2+C_2^2}}$$
$$\phi = \frac{1}{2}\tan^{-1}\frac{C_2}{C_1}$$

Now, all we have to do is determine how to calculate those coefficients from the data.

We begin by calculating $(p_i, \beta_i)$ for each point $(u_i, v_i)$ in the data set. Knowing $\beta_i$ at each point, we can calculate $f_i$ in terms of the coefficients. Therefore, if we knew the coefficient values we could calculate the error between the model and the observed data.

$$\varepsilon = \sum_{i=1}^{n}(p_i - f_i)^2$$

To find the best values for the coefficients, we set $$\frac{\partial \varepsilon}{\partial C_j} = 0, \quad 1 \leq j \leq 3$$

This is equivalent to $$-2\sum_{i=1}^{n}(p_i - f_i)\frac{\partial f_i}{\partial C_j} = 0, \quad 1 \leq j \leq 3$$

This leads to three equations in three unknowns.

$$\begin{bmatrix} A_{11} & A_{12} & A_{13} \\ A_{21} & A_{22} & A_{23} \\ A_{31} & A_{32} & A_{33} \end{bmatrix} \begin{bmatrix} C_1 \\ C_2 \\ C_3 \end{bmatrix} = \begin{bmatrix} B_1 \\ B_2 \\ B_3 \end{bmatrix}$$

All of the terms in the A and B matrices can be calculated from the observed data. The values of the coefficients $\{C_1, C_2, C_3\}$ can then be found by solving this set of equations. The matrix elements are obtained from the data points by the following computations:

$$A_{11} = A_{23} = \sum_{i=1}^{n}\cos 2\beta_i$$

$$A_{12} = A_{33} = \sum_{i=1}^{n}\sin 2\beta_i$$

$$A_{13} = n$$

$$A_{21} = \sum_{i=1}^{n} \cos^2 2\beta_i$$

$$A_{22} = A_{31} = \sum_{i=1}^{n} \cos 2\beta_i \sin 2\beta_i$$

$$A_{32} = \sum_{i=1}^{n} \sin^2 2\beta_i$$

$$B_1 = \sum_{i=1}^{n} \rho_i$$

$$B_2 = \sum_{i=1}^{n} \rho_i \cos 2\beta_i$$

$$B_3 = \sum_{i=1}^{n} \rho_i \sin 2\beta_i$$

The functions $\cos 2\beta_i$ and $\sin 2\beta_i$ can be computed directly from the coordinate values of the data points without first calculating the angles. This is based on the fact that $$\cos\beta_i = \frac{u_i}{\sqrt{u_i^2 + v_i^2}}$$

$$\sin\beta_i = \frac{v_i}{\sqrt{u_i^2 + v_i^2}}$$

the double angle formulas give us $$\cos 2\beta_i = \cos^2 \beta_i - \sin^2 \beta_i = \frac{u_i^2 - v_i^2}{u_i^2 + v_i^2}$$

$$\sin 2\beta_i = 2\sin\beta_i \cos\beta_i = \frac{2u_i v_i}{u_i^2 + v_i^2}$$

If we define a pair of parameters $$g_i = \frac{u_i^2 - v_i^2}{u_i^2 + v_i^2}$$

$$h_i = \frac{2u_i v_i}{u_i^2 + v_i^2}$$

then all of the equations for the matrix elements can be expressed simply in terms of these parameters.

$$A_{11} = A_{23} = \sum_{i=1}^{n} g_i$$

$$A_{12} = A_{33} = \sum_{i=1}^{n} h_i$$

$$A_{13} = n$$

$$A_{21} = \sum_{i=1}^{n} g_i^2$$

$$A_{22} = A_{31} = \sum_{i=1}^{n} g_i h_i$$

$$A_{32} = \sum_{i=1}^{n} h_i^2$$

$$B_1 = \sum_{i=1}^{n} \rho_i$$

$$B_2 = \sum_{i=1}^{n} \rho_i g_i$$

$$B_3 = \sum_{i=1}^{n} \rho_i h_i$$

Finally, the solutions for the unknown coefficients can be found by $$C = A^{-1} B$$

The major and minor axes as well as the angle can be calculated from the coefficient values using Equation 6.

The ellipse edge fitting procedure does not require the points on the rim of the lens to be sorted in any particular order. The points in the sets L, R, T and B that were found in the original edge search can all be used. The values of ($g_i$, $h_i$, $p_i$) are calculated for each point in the set, and then the results are combined according to the above equations to find the parameters.

System Flow Charts

As discussed with respect to FIG. 1, a computer 64 operates apparatus that obtains the images of the cuvettes passing on the star-wheel 1 and analyzes the images to detect lens defects that will result in rejection of the lens in manufacturing. The computer operates with a program that is described hereafter with flow charts. This computer program is preferably written in the C++ programming language. The program steps required to implement the functions described in the flow charts will be apparent to programmers of ordinary skill.

Figure 31:
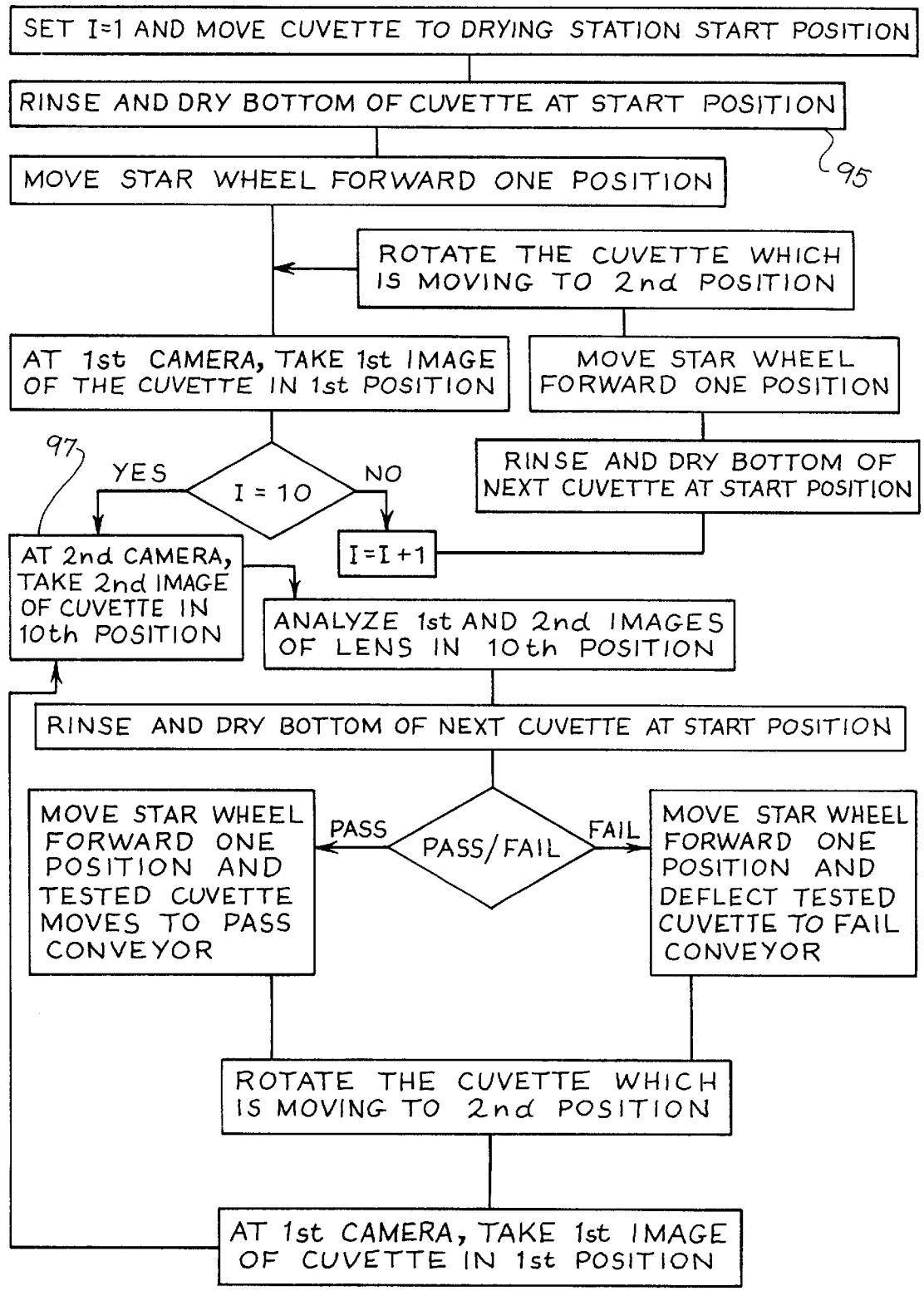
FIG. 31 is a flow chart of computer program functions for obtaining first and second images of each lens in the lens inspection process.

FIG. 31 is a flow chart of the functional steps for obtaining images of each contact lens as it moves around a star-wheel in the manufacturing process. As shown in block 95, moisture on the bottom of the cuvette is dried by a jet of air when the cuvette moves to a start position 29 as shown in FIG. 1. The star-wheel 1 is then moved forward one position so that the cuvette moves to the first camera position 11 and a first image is taken of the contact lens in solution in the cuvette. Thereafter, moisture at the bottom of the next cuvette is dried at the start position 29, the star-wheel is moved forward one position and the cuvette that was at the first position moves to the second position and is rotated by the tape 45 as it moves to the second position. A first image is then taken of the cuvette that is now positioned at the first camera position 11.

As shown in the flow chart, the described operation continues until a count of ten, at which time the cuvette which had its image taken at the beginning has moved to the second camera position 13 shown in FIG. 1. As shown at box 97 of FIG. 31, the second camera takes a second image of the cuvette in the tenth position 13. Thereafter, the first and second images of the lens and cuvette in the tenth position are analyzed by the computer program and a pass/fail determination is made for the lens. The lens is then moved to pass or fail conveyors depending upon the outcome of the computer defect analysis. The process continues as cuvettes and contact lenses are moved around the star-wheel.

The process is effective because two image stations allow continuous movement of cuvettes on the star-wheel. The number of cuvettes between the first and second image positions was defined as ten in order to allow sufficient time for the rotational movement of the cuvette, lens and solution to stop before the second image is taken. The system is not limited to any particular number of optical inspection stations or lens positions between optical inspection stations. Indeed, a single optical inspection station could be used to take both the first and second images for each cuvette. In this case, there would need to be a time delay between the first and second images in order to allow the motion of the solution and lens to stop before the second image is taken. It is preferred to use two spaced optical inspection stations in order to provide continually moving cuvettes and thereby increase the throughput of the system.

Figure 32:
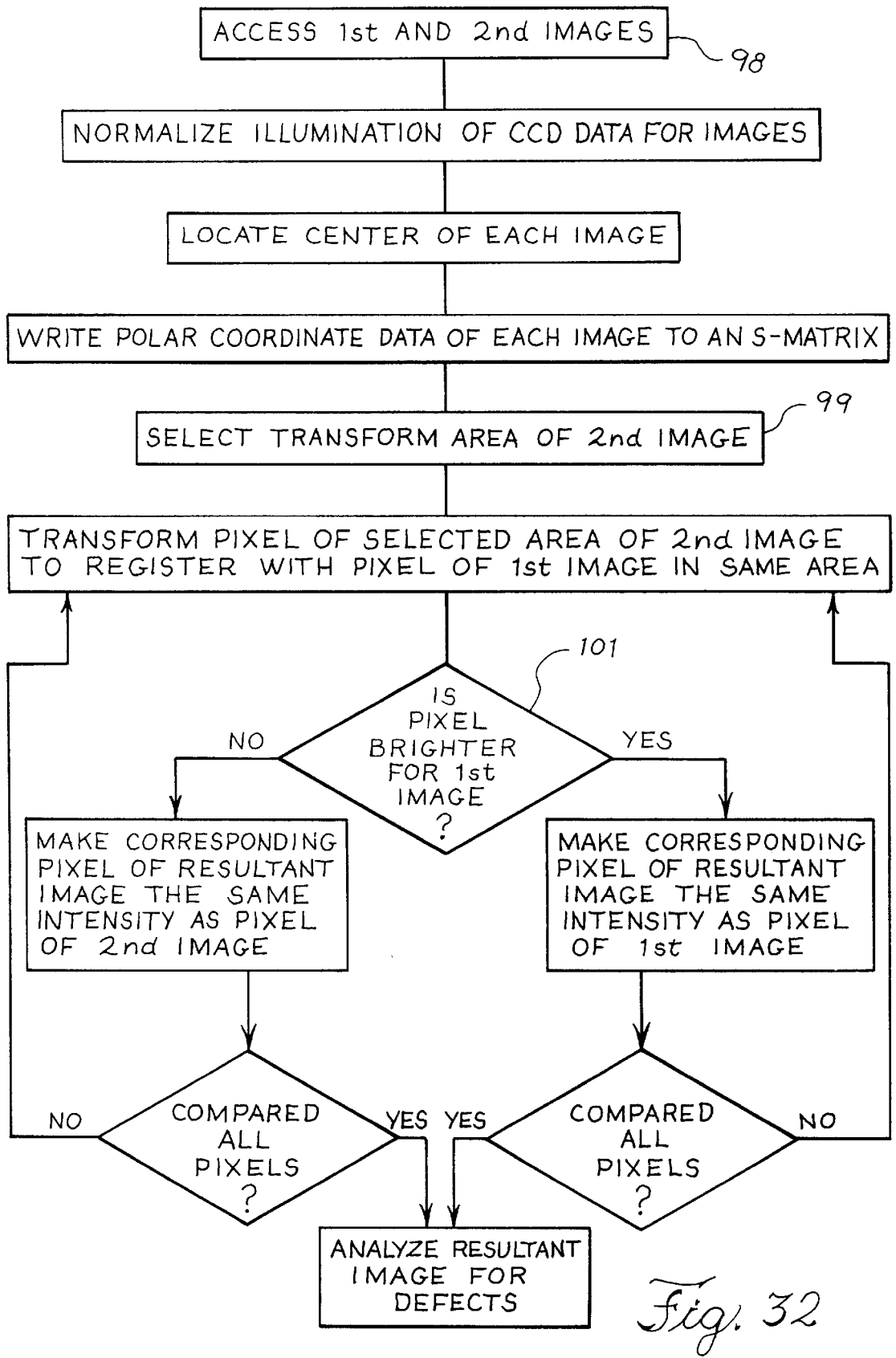
FIG. 32 is a flow chart of computer program functions that eliminate artifacts caused by contaminants in the lens solution and marks on the cuvette.

FIG. 32 illustrates a flow chart of program functions that combine the first and second images of a cuvette and lens to provide a resultant image that excludes artifacts produced by contaminants in the lens solution and scratches or marks on the cuvette. With reference to the box 98 of FIG. 32, the first and second images are accessed for each cuvette discussed with respect to FIG. 31. The light intensity information for these images is thereafter normalized to compensate for variations in ambient light. The center of each image is then located in a manner that will be described hereafter and the light intensity data is represented in polar coordinates that are stored in a rectangular S-matrix.

Although artifacts could be eliminated from the entire image of the lens, the computational effort is not necessarily required. In practice it has been found that only some areas of the lens need be corrected to eliminate artifacts which are not defects. It has been found that areas such as the optical zone, color printed iris and logo can be analyzed effectively by first eliminating artifacts. As shown at box 99, the program therefore requires a particular area of the second image to be selected for elimination of artifacts. The pixels in this area are transformed, for example by the use of an affine mathematical transform, to register the pixels of the second image to corresponding pixels of the first image. As shown at the decision box 101, the program compares each pair of pixels from the first and second image and generates a pixel of a resultant image that has the same intensity as the brightest of the compared pixels. The resultant image therefore eliminates any artifacts that changed position with respect to the lens. The moving artifacts or defect features are eliminated from the resultant image. The resultant image is then analyzed to detect defects.

Figure 33:
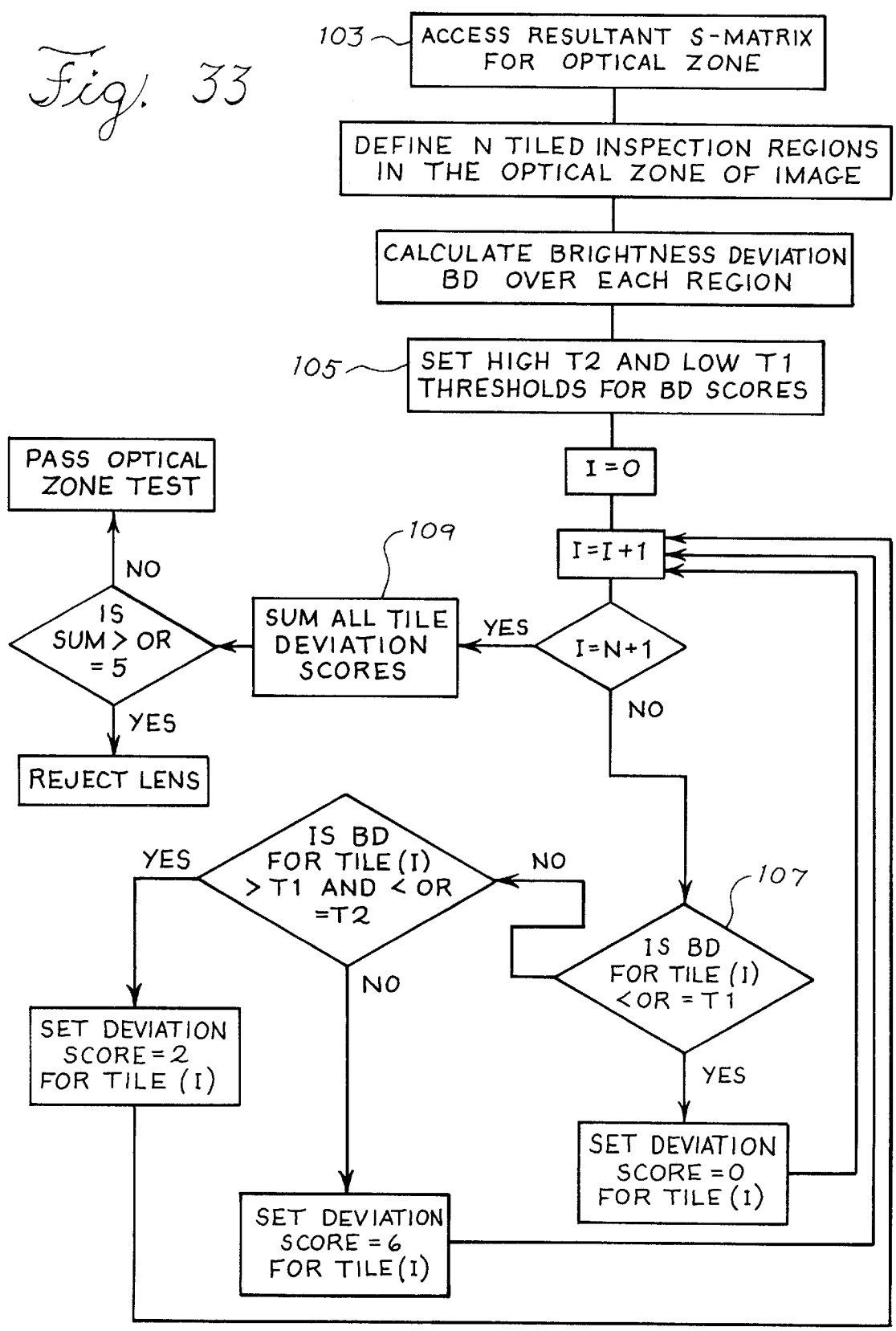
FIG. 33 is a flow chart of computer program functions for inspecting the optical zone of the lens.

FIG. 33 illustrates a flow chart of the computer functions that are used to test the optical zone at the center of the lens. As shown at box 103, the S-matrix for N tiled inspection regions is accessed for the optical zone. The brightness deviation BD is calculated over each region. The brightness deviation BD for each region is determined by the degree to which dark features in the region vary from an average light intensity measured at the region.

As shown at block 105, a high threshold T2 and a low threshold T1 are set in order to assign scores to the brightness deviation for each region. Thereafter, as shown at the decision box 107, the brightness deviation score for each tile is set to 0 if the brightness deviation is less than or equal to T1. If the brightness deviation for the tile is greater than T1 and less than or equal to T2, the deviation score is set to 2. If the brightness deviation is greater than T2, the deviation score is set to 6. Scores are assigned for all of the inspection regions in the optical zone and, as shown at box 109, the scores are summed and the lens is rejected if the sum is greater than or equal to 5. The lens passes the optical zone test if the sum of tile deviation scores is less than 5.

Figure 34:
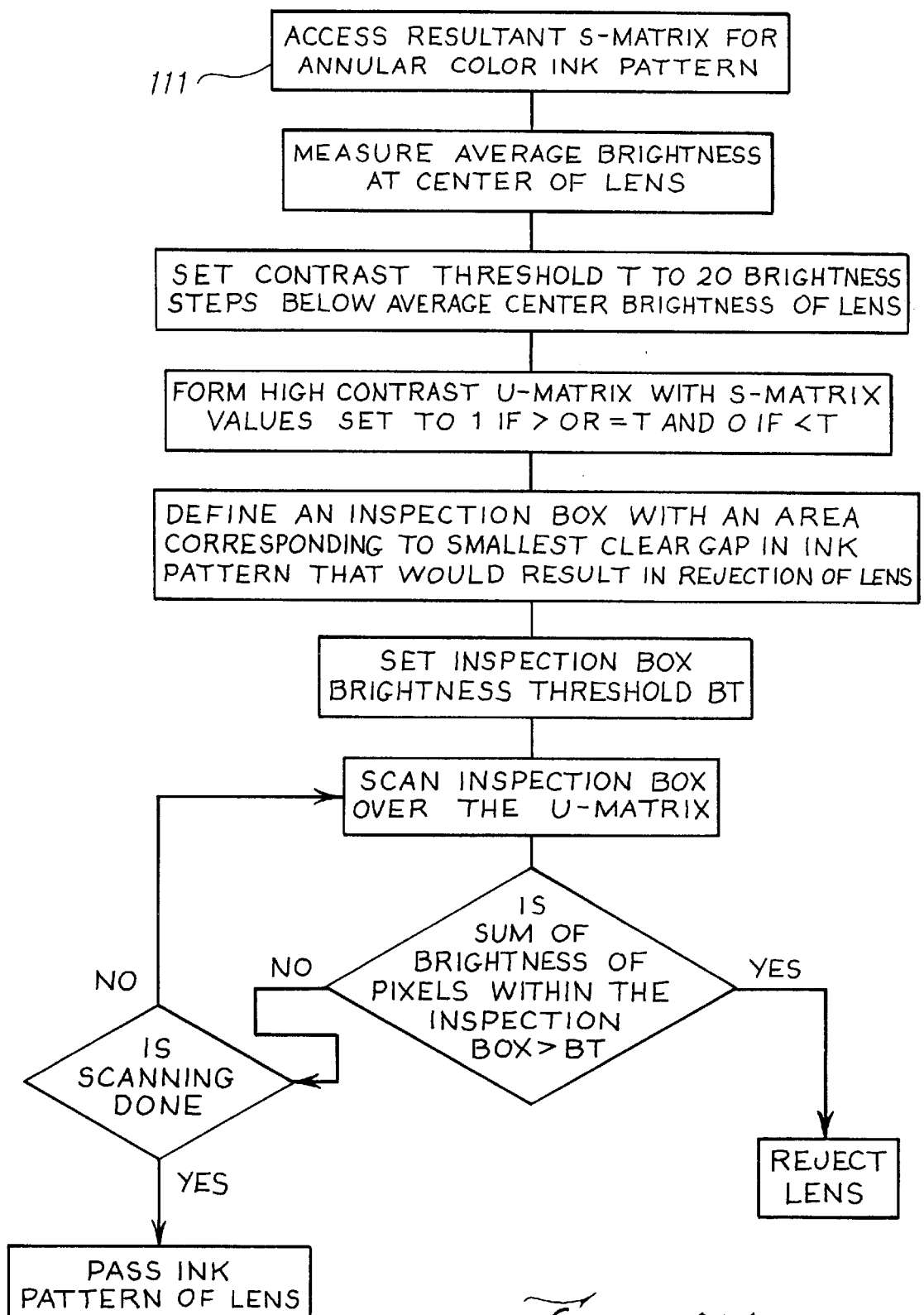
FIG. 34 is a flow chart of computer program functions for inspecting the printed iris area of the lens.

FIG. 34 illustrates the functional program steps that are used to analyze the iris ink pattern for unacceptable gaps. As shown at box 111, the resultant S-matrix corrected for artifacts is accessed for the annular colored iris ink pattern. A threshold T is then set to twenty brightness steps below the average brightness at the center of the optical zone of the lens. A U-matrix is then calculated from the threshold T and S-matrix. Each light intensity value of the S-matrix is set to 1 and copied to the U-matrix if it is greater than or equal to T and is set to 0 and copied to the U-matrix if it is less than T. The U-matrix therefore contains a relatively high contrast image of the ink pattern. The threshold T is selected to enhance the features of the ink pattern for inspection.

An inspection box is then defined with an area that corresponds to the smallest clear gap in the ink pattern that would result in rejection of the lens. An inspection box brightness threshold BT is then set. Thereafter the box is scanned over the U-matrix and, if the sum of the brightness of the pixels within the inspection box is greater than the brightness threshold BT, the lens is rejected. If the sum of the brightness of the pixels within the inspection box is equal to or less than the brightness threshold BT, the scanning of the box is continued. If the box scans the entire U-matrix and finds no sum of brightness pixels greater than the brightness threshold BT, the ink pattern test for the lens is passed.

Figure 35A:
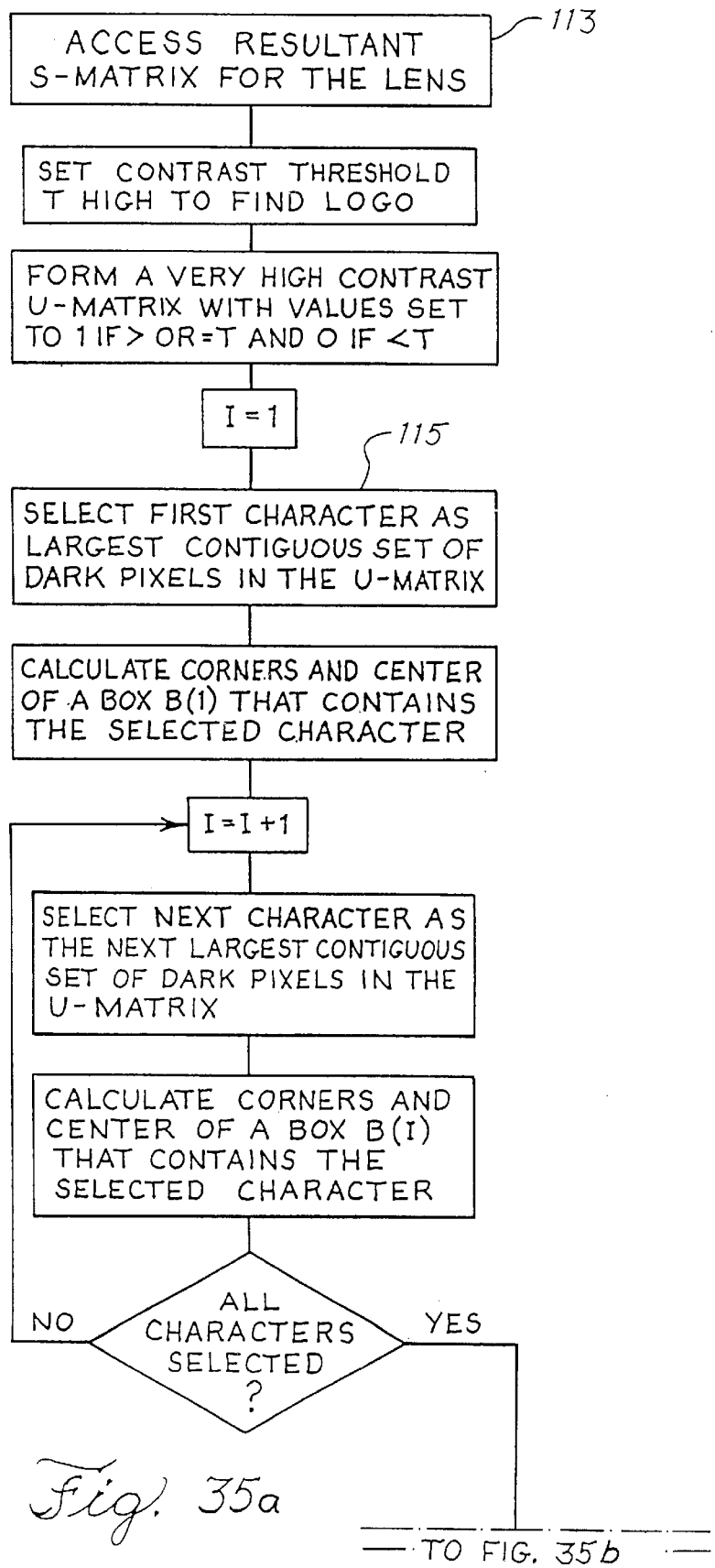
FIG. 35a is the first part of a flow chart of computer program functions for inspecting a printed logo of the lens.
Figure 35B:
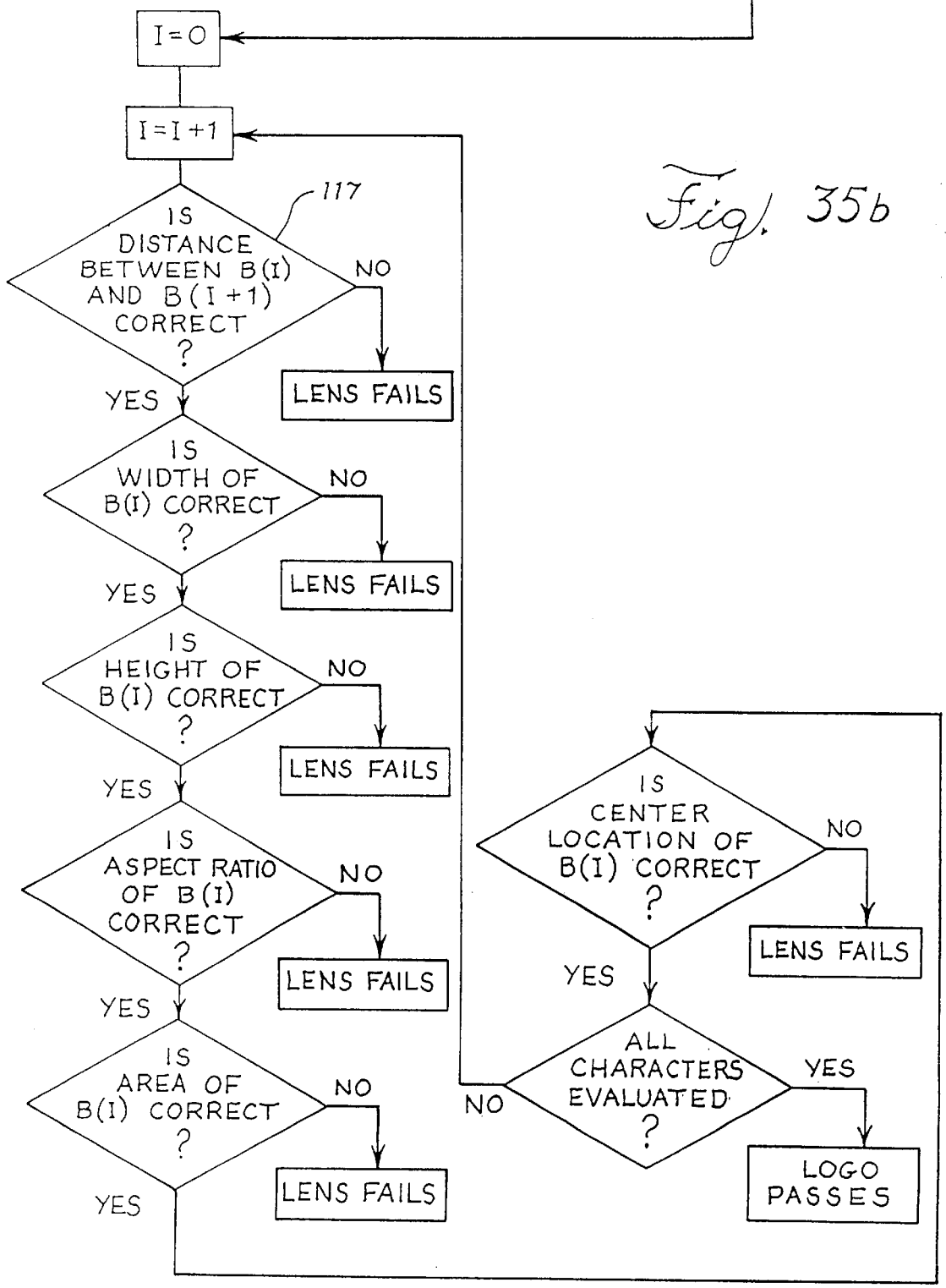
FIG. 35b is the second part of a flow chart of computer program functions for inspecting a printed logo of the lens.

FIGS. 35a and 35b illustrate the functional program steps for analyzing the characters of the logo that is printed on the contact lens. As shown at the box 113 of FIG. 35a, the resultant S-matrix for the lens is accessed to provide data from which artifacts have been removed. A very high contrast threshold T is set and a U-matrix is used in the previously described manner to provide a very high contrast image that essentially shows only the dark logo printed area of the lens.

As shown at box 115 of FIG. 35a, the logo is analyzed to select as the first character the largest contiguous set of dark pixels in the U-matrix. A box B(1) is then dimensioned to enclose this character. Thereafter, successive characters of diminishing size are selected and boxes containing these characters are defined until all characters have been detected. In the described embodiment only two characters, W and J, are detected.

As shown starting at a decision box 117 of FIG. 35b, selected geometric characteristics of each character box are checked. The lens fails if any required geometrical characteristic is not detected for a character. If all of the characters have the required geometric characteristics, the lens passes.

Figure 36:
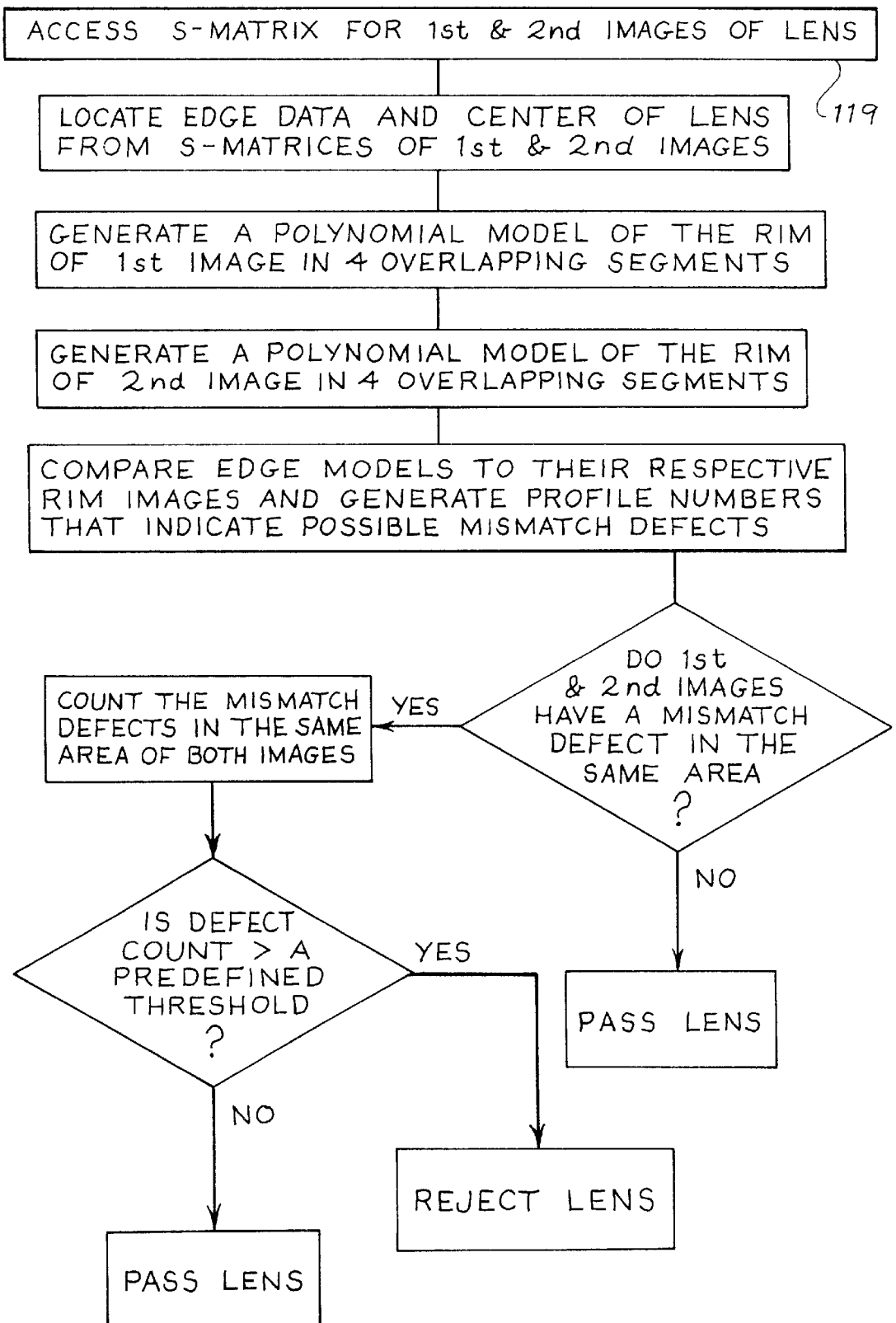
FIG. 36 is a flow chart of computer program functions for inspecting the rim of the lens.

FIG. 36 illustrates the functional steps required by the computer program to detect defects on the edge or rim of the lens. As shown at box 119, the S-matrix for the first and second images is accessed. The edge data for each image is defined by a black horizontal line of the S-matrix. This edge data is located in each S-matrix and the center of the lens is determined for each image. The edge data may be located by first applying an ellipse approximation and outlier data points may be eliminated as previously described. Thereafter tenth order polynomials are defined to make a model of the rim of each image in four overlapping segments. A particular order of polynomial and number of overlapping segments is not required. However, the tenth order and four overlapping segments have been found adequate in experimental tests.

The polynomial edge model for each image is then compared to the actual edge data and profile numbers are generated to indicate mismatches between the model and rim data that could indicate a possible defect. The locations of the possible defects for the first and second images are then compared to determine if a mismatch occurs in the same area of each image. If a mismatch is in the same area, the apparent defect is counted and the location of mismatches, generation of profile numbers and comparison of apparent defects continues until all apparent defects have been found. If the number of apparent defects exceeds a predetermined threshold, the lens is rejected. The lens is passed if no defects or fewer defects than the predetermined threshold are found.

Figure 37:
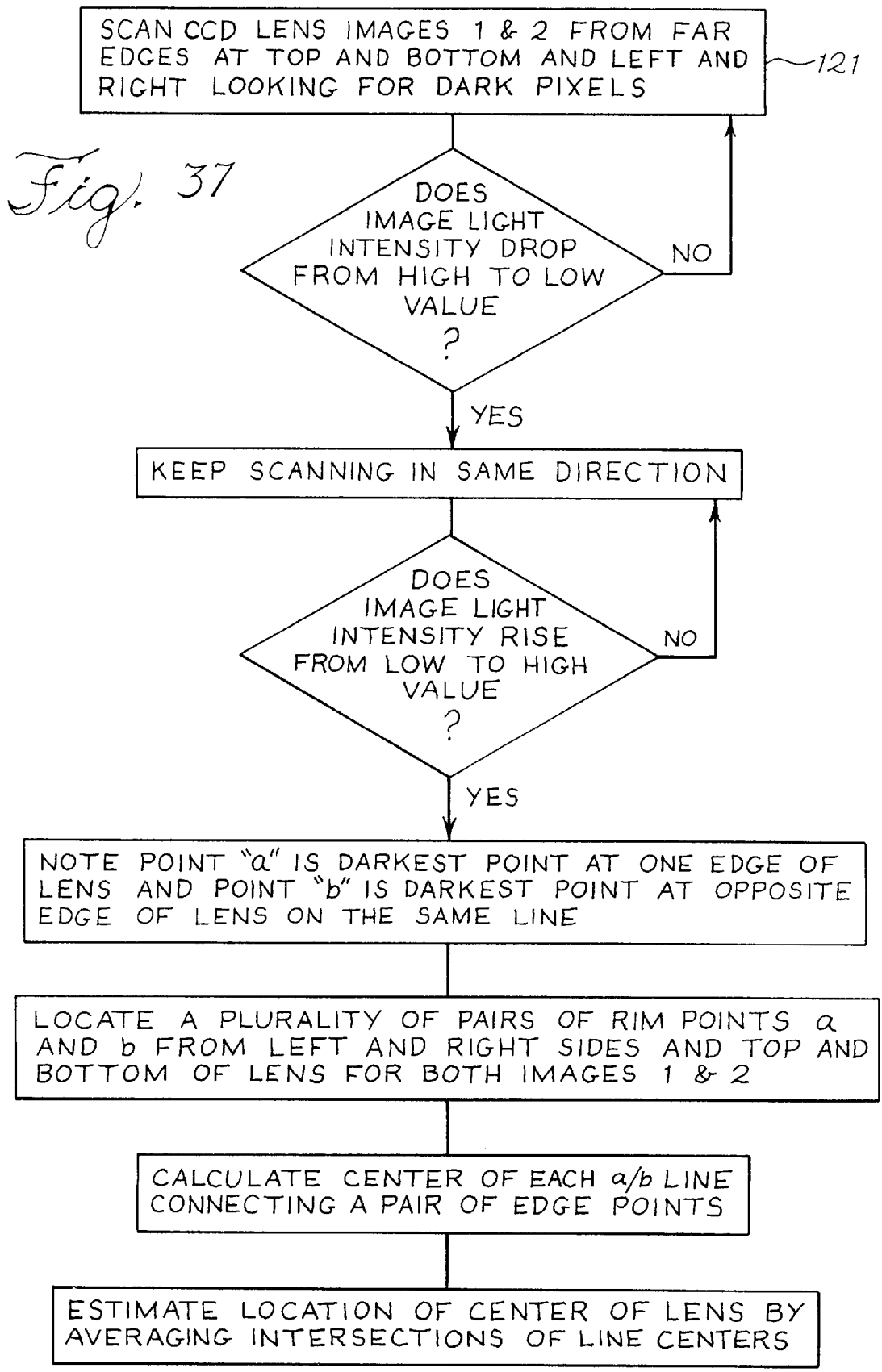
FIG. 37 is a flow chart of computer program functions for locating the center and rim of the lens.

FIG. 37 illustrates the program functions that are required to locate the center and the edge or rim of the lens. As shown at the box 121, the light intensity data from the charge coupled devices of the cameras are scanned for each lens image at the top and bottom and left and right to look for dark pixels. In scanning inward from the dark edge of the image, the program detects when the light intensity of the image drops from a high intensity to a low intensity. This sharp drop in intensity locates the edge of the rim. As scanning continues in the same direction, the program detects the sharp rise in intensity from a low to a high value. The program selects "a" as the darkest point at the detected edge of the lens. Scanning continues on the same horizontal line from the opposite edge of the lens and generates a point "b" in the same fashion that is the darkest point at the opposite edge of the lens. A plurality of pairs of rim points are obtained in this fashion from the left and right sides and top and bottom sides of the lens for both of the lens images 1 and 2. This process locates points on or adjacent to the rim of the lens. The center of each a-b line is calculated to define a number of lines that pass through the center of the lens. The location of the center of the lens is estimated by averaging the intersection of these lines. This estimation may be improved by eliminating outlier points, for example by polynomial or ellipse edge modeling.

While it is preferred to program the functions of the lens inspection system in the $C^{++}$ language and in separate subroutines as illustrated to facilitate changes and corrections, the scope of the invention is not limited to any particular programming language or arrangement of subroutines. The invention includes within its scope any programming language or arrangement of subroutines that could be used to achieve the functions and features of the lens inspection system of the invention.

The disclosed models of manufacturing equipment such as cameras, strobes, cuvettes, diffusers and collimators could be changed without departing from the invention. For example, cuvettes or other types of lens holders of different shape and with or without bottom lens surfaces could be employed without departing from the invention. The invention is also not limited to the use of adhesive tape to rotate cuvettes or lens holders or to the use of two cameras. One camera or more than two cameras could be used to take two or more images of lenses. The system of the invention can also be used to inspect lenses other than soft contact lenses. For example, hard contact lenses or hard lenses of any kind could be inspected by the system of the invention with or without suspension solutions.

The invention may therefore be embodied in other specific forms than those described without departing from its spirit or essential characteristics. The present embodiments are, therefore, to be considered in all respects as illustrative and not restrictive.

We claim:

1. A method for automatically inspecting a plurality of lenses, comprising the steps of:

placing each lens in a lens holder;

taking a first image of each lens in its lens holder;

rotating each lens holder;

taking a second image of each lens in the rotated lens holder;

registering each pixel of said second image with the corresponding pixel of said first image;

comparing the pixels of at least a portion of each first image and the registered pixels of the corresponding portion of said second image;

generating a resultant image from the comparison of said pixels;

recognizing as lens defects the defect features of said first image that have corresponding defect features in the registered second image; and rejecting as defective any of said lenses that have a predetermined number of said recognized lens defects.

2. The method of claim 1, wherein said step of generating includes generating said resultant image with pixels that each have the same light intensity as the brighter of the two corresponding compared pixels.

3. The method of claim 1, further including the step of obtaining said first and second images with two spaced optical inspection stations, each station using a strobe light to momentarily illuminate the lens and lens holder and a digital camera to record an image of the lens and lens holder.

4. The method of claim 1, further including the step of obtaining said first and second images with a single optical inspection station which:

uses a strobe light to momentarily illuminate the lens and lens holder;

records the first image with a digital camera;

rotates the lens holder, uses the strobe light to momentarily illuminate the displaced lens and lens holder; and records the second image with the digital camera.

5. The method of claim 1, further including the step of normalizing the light intensity of said first and second images to correct for variations in ambient light.

6. The method of claim 1, further including the step of providing a digital representation of the light intensity at each pixel of said images, locating the center of each of said images, and storing polar coordinate light intensity data for each image in an S-matrix wherein the data is stored in columns of fixed angle and rows of fixed radius.

7. The method of claim 1, further including the steps of:

defining a plurality of light sensing regions in the optical zone of said lens;

determining the deviation in brightness across each of said regions;

assigning a number score to each region based upon the magnitude of the deviation in brightness across the region; and rejecting the lens when the sum of the scores exceeds a predefined threshold.

8. The method of claim 1, further including the steps of:

determining the light intensity of each pixel of a predefined portion of each of said images;

defining a light intensity threshold for enhancing the contrast of said predefined portion;

setting pixels with light intensities equal to or above the threshold to "1" and light intensities below the threshold to "0" ; and analyzing the resultant pixel values to detect areas of excessive brightness.

9. The method of claim 8, wherein said step for defining a light intensity threshold includes setting said threshold to be 20 brightness steps lower than the average brightness at the center of the optical zone of said lens.

10. The method of claim 8, further including steps for analyzing a printed iris annular area of a lens, the steps including:
   defining an inspection box having a cross-sectional area corresponding in size to the smallest clear gap in said printed iris that would lead to rejection of the lens;
   scanning said inspection box over a matrix of said resultant pixel values for said printed iris area; and
   rejecting said lens if the sum of resultant pixel values within the inspection box is greater than a predefined inspection box threshold.

11. The method of claim 10, wherein said predefined inspection box threshold is 80% of the size of the inspection box.

12. The method of claim 8, further including steps for analyzing printed characters on said lens, the steps including:
   (a) defining said light intensity threshold for separating said relatively dark printed characters from other dark patterns on said lens;
   (b) forming a character matrix of said resultant pixel values for the area of said printed characters;
   (c) selecting the first character as the largest contiguous set of dark pixels in said character matrix;
   (d) calculating the corners and center of a box that contains said first character;
   (e) selecting the next character as the next largest contiguous set of dark pixels in said character matrix;
   (f) calculating the corners and center of a box that contains said next character;
   (g) repeating steps (e) and (f) until all characters have been selected; and
   (h) evaluating at least one geometric characteristic of at least one of said boxes relative to at least one acceptance specification to determine whether the characters are acceptable.

13. The method of claim 12, wherein said geometric characteristic includes the distance between the centers of at least two character boxes.

14. The method of claim 12, wherein said geometric characteristic includes the width of at least one of said boxes.

15. The method of claim 12, wherein said geometric characteristic includes the height of at least one of said boxes.

16. The method of claim 12, wherein said geometric characteristic includes the aspect ratio of the height and width of at least one of said boxes.

17. The method of claim 12, wherein said geometric characteristics includes the area of at least one of said boxes.

18. The method of claim 12, wherein said geometric characteristic includes the location of the center of at least one of said boxes.

19. The method of claim 1, further including the steps of:
   generating a mathematical model of the edge of said lens;
   comparing the measured light intensities of the pixels adjacent to the edge of said first and second images to the light intensities of said model at predefined angles around the edges of the images;
   generating an edge profile number for each such angular edge comparison that is representative of how well the measured edge profile of the image compares to the model;
   locating the points on the edge profiles for the first and second images that have numbers representative of a mismatch; and
   rejecting the lens if a predefined number of mismatches for the first image correspond in position to mismatches for the second image.

20. The method of claim 19, wherein said step of generating includes generating a polynomial model of the edge of the lens.

21. The method of claim 19, wherein said step of generating includes generating an ellipse model of the edge of the lens.

22. A method for automatically inspecting a lens, comprising the steps of:
   placing at least one lens in solution in a lens holder;
   obtaining a first image of said lens;
   moving said lens, solution and lens holder with respect to one another;
   obtaining at least a second image of said lens;
   comparing pixels of said first image to corresponding registered pixels of said second image; and
   recognizing a lens defect only if a plurality of pixels of said first image and the corresponding plurality of registered pixels of said second image are both dark.

23. A method for automatically inspecting a lens, comprising the steps of:
   placing a lens in solution in a lens holder;
   taking a first image of said lens in said holder;
   rotating said holder, lens and said solution,
   taking a second image of said lens in said holder;
   comparing portions of said first image and corresponding registered portions of said second image; and
   providing a resultant image that eliminates differences between said first and second images.

24. A method for automatically inspecting at least one lens, comprising the steps of:
   (a) placing a lens in solution in a lens holder;
   (b) taking a first image of said lens in said holder;
   (c) moving said holder, lens and said solution;
   (d) taking an additional image of said lens in said holder after said movement has stopped;
   (e) repeating steps (c) and (d) to take a predetermined number of additional images of said lens in said holder;
   (f) comparing at least a portion of said first image with corresponding registered portions of each of said additional images;
   (g) generating at least one resultant image from the comparison of the images; and
   (h) recognizing as lens defects the defect features of said first image that have corresponding defect features in the registered additional images.

25. A method for automatically inspecting a lens, comprising the steps of:
   placing the lens in solution in a lens holder;
   taking a first image of said lens in said holder;
   rotating said holder, lens and said solution;
   taking a second image of said lens in said holder;
   comparing the light intensity of pixels of at least one portion of said first image with the light intensity of pixels of a corresponding portion of said second image; and
   providing a resultant image with pixels that each have the same light intensity as the brighter of the corresponding pair of compared pixels.

26. A method for automatically inspecting a lens, comprising the steps of:
　　placing a lens in solution in a lens holder;
　　taking a first image of the lens in its lens holder;
　　providing relative movement between the lens and its lens holder;
　　taking a second image of the lens and its lens holder;
　　registering each pixel of said second image with the corresponding pixel of said first image;
　　comparing the pixels of at least a portion of the first image and the registered pixels of the corresponding portion of said second image;
　　generating a resultant image from the comparison of said pixels; and
　　recognizing as lens defects the defect features of said first image that have corresponding defect features in the registered second image.

27. The method of claim 26, wherein said step of generating includes generating said resultant image with pixels that each have the same light intensity as the brighter of the two corresponding compared pixels.

28. The method of claim 26, further including the step of obtaining said first and second images with two spaced optical inspection stations, each station using a strobe light to momentarily illuminate the lens and holder and a digital camera to record an image of the lens and lens holder.

29. The method of claim 26, further including the step of obtaining said first and second images with a single optical inspection station which:
　　momentarily illuminates the lens and holder;
　　records the first image with a digital camera;
　　rotates the holder;
　　momentarily illuminates the displaced lens and holder; and
　　records the second image with the digital camera.

30. The method of claim 26, further including the step of normalizing the light intensity of said first and second images to correct for variations in ambient light.

31. The method of claim 26, further including the step of providing a digital representation of the light intensity at each pixel of said images, locating the center of each of said images, and storing polar coordinate light intensity data for each image in an S-matrix wherein the data is stored in columns of fixed angle and rows of fixed radius.

32. The method of claim 26, further including the steps of:
　　defining a plurality of light sensing regions in the optical zone of said lens;
　　determining the deviation in brightness across each of said regions;
　　assigning a number score to each region based upon the magnitude of the deviation in brightness across the region; and
　　rejecting the lens when the sum of the scores exceeds a predefined threshold.

33. The method of claim 26, further including the steps of:
　　determining the light intensity of each pixel of a predefined portion of each of said images;
　　defining a light intensity threshold for enhancing the contrast of said predefined portion;
　　setting pixels with light intensities equal to or above the threshold to "1" and light intensities below the threshold to "0"; and
　　analyzing the resultant pixel values to detect areas of excessive brightness.

34. The method of claim 33, wherein said step for defining a light intensity threshold includes setting said threshold to be 20 brightness steps lower than the average brightness at the center of the optical zone of said lens.

35. The method of claim 33, further including steps for analyzing a printed iris annular area of a lens, the steps including:
　　defining an inspection box having a cross-sectional area corresponding in size to the smallest clear gap in said printed iris that would lead to rejection of the lens;
　　scanning said inspection box over a matrix of said resultant pixel values for said printed iris area; and
　　rejecting said lens if the sum of resultant pixel values within the inspection box is greater than a predefined inspection box threshold.

36. The method of claim 35, wherein said predefined inspection box threshold is 80% of the size of the inspection box.

37. The method of claim 33, further including steps for analyzing printed characters on said lens, the steps including:
　　(a) defining said light intensity threshold for separating said relatively dark printed characters from other dark patterns on said lens;
　　(b) forming a character matrix of said resultant pixel values for the area of said printed characters;
　　(c) selecting the first character as the largest contiguous set of dark pixels in said character matrix;
　　(d) calculating the corners and center of a box that contains said first character;
　　(e) selecting the next character as the next largest contiguous set of dark pixels in said character matrix;
　　(f) calculating the corners and center of a box that contains said next character;
　　(g) repeating steps (e) and (f) until all characters have been selected; and
　　(h) evaluating at least one geometric characteristic of at least one of said boxes relative to at least one acceptance specification to determine whether the characters are acceptable.

38. The method of claim 37, wherein said geometric characteristic includes the distance between the centers of at least two character boxes.

39. The method of claim 37, wherein said geometric characteristic includes the width of at least one of said boxes.

40. The method of claim 37, wherein said geometric characteristic includes the height of at least one of said boxes.

41. The method of claim 37, wherein said geometric characteristic includes the aspect ratio of the height and width of at least one of said boxes.

42. The method of claim 37, wherein said geometric characteristic includes the area of at least one of said boxes.

43. The method of claim 37, wherein said geometric characteristic includes the location of the center of at least one of said boxes.

44. The method of claim 26, further including the steps of:
　　generating a polynomial model of the edge of said lens;
　　comparing the measured light intensities of the pixels adjacent to the edge of said first and second images to the light intensities of said model at predefined angles around the edges of the images;
　　generating an edge profile number for each such angular edge comparison that is representative of how well the measured edge profile of the image compares to the model;

locating the points on the edge profiles for the first and second images that have numbers representative of a mismatch; and rejecting the lens if a predefined number of mismatches for the first image correspond in position to mismatches for the second image.

45. A method for automatically inspecting a plurality of lenses, comprising the steps of:

obtaining at least one image of each lens;

generating a polynomial model of the edge of said lens;

comparing the measured light intensities of the pixels adjacent to the edge of each of said images to the light intensities of said model at predefined angles around the edges of the image;

generating an edge profile number for each such angle edge comparison that is representative of how well the measured edge profile of the image compares to the model;

locating the points on the edge profile for the image that have numbers representative of a mismatch; and rejecting the lens if the mismatches exceed a predefined number of mismatches;

defining a plurality of light sensing regions in the optical zone of said lens;

determining the deviation in brightness across each of said regions;

assigning a number score to each region based upon the magnitude of the deviation in brightness across the region; and rejecting the lens when the sum of the scores exceeds a predefined threshold.

46. The method of claim 45, further including the steps of:

determining the light intensity of each pixel of a predefined portion of each of said images;

defining a light intensity threshold for enhancing the contrast of said predefined portion;

setting pixels with light intensities equal to or above the threshold to "1" and light intensities below the threshold to "0"; and analyzing the resultant pixel values to detect areas of excessive brightness.

47. The method of claim 46, wherein said step of defining a light intensity threshold includes setting said threshold to be 20 brightness steps lower than the average brightness at the center of the optical zone of said lens.

48. The method of claim 46, further including steps for analyzing a printed iris annular area of a lens, the steps including:

defining an inspection box having a cross-sectional area corresponding in size to the smallest clear gap in said printed iris that would lead to rejection of the lens;

scanning said inspection box over a matrix of said resultant pixel values for said printed iris area; and rejecting said lens if the sum of resultant pixel values within the inspection box is greater than a predefined inspection box threshold.

49. The method of claim 48, wherein said predefined inspection box threshold is 80% of the size of the inspection box.

50. The method of claim 46, further including steps for analyzing printed characters on said lens, the steps including:

(a) defining said light intensity threshold for separating said relatively dark printed characters from other dark patterns on said lens;

(b) forming a character matrix of said resultant pixel values for the area of said printed characters;

(c) selecting the first character as the largest contiguous set of dark pixels in said character matrix;

(d) calculating the corners and center of a box that contains said first character;

(e) selecting the next character as the next largest contiguous set of dark pixels in said character matrix;

(f) calculating the corners and center of a box that contains said next character;

(g) repeating steps (e) and (f) until all characters have been selected; and (h) evaluating at least one geometric characteristic of at least one of said boxes relative to at least one acceptance specification to determine whether the characters are acceptable.

51. The method of claim 50, wherein said geometric characteristic includes the distance between the centers of at least two character boxes.

52. The method of claim 50, wherein said geometric characteristic includes the width of at least one of said boxes.

53. The method of claim 50, wherein said geometric characteristic includes the height of at least one of said boxes.

54. The method of claim 50, wherein said geometric characteristic includes the aspect ratio of the height and width of at least one of said boxes.

55. The method of claim 50, wherein said geometric characteristic includes the area of at least one of said boxes.

56. The method of claim 50, wherein said geometric characteristic includes the location of the center of at least one of said boxes.

57. The method of claim 50, further including the step of normalizing the light intensity of each of said images to correct for variations in ambient light.

58. The method of claim 45, further including the steps of providing a digital representation of the light intensity at each pixel of each of said images, locating the center of each of said images and storing polar coordinate light intensity data for each image in a rectangular S-matrix.

59. A method for automatically inspecting a plurality of lenses, comprising the steps of:

obtaining at least one image of each lens;

providing a digital representation of the light intensity at each pixel of each of said images;

locating the center of each of said images;

storing polar coordinate light intensity data for each image in a rectangular S-matrix; and using the data of said S-matrix to analyze portions of each of said images for lens defects.

60. The method of claim 59, wherein said step of using includes using the data to analyze the optical zone of each lens for defects.

61. The method of claim 59, wherein said step of using includes using the data to analyze a logo of each lens for defects.

62. The method of claim 59, wherein said step of using includes using the data to analyze a printed annular area of each lens for defects.

63. The method of claim 59, wherein said step of using includes using the data to analyze the edge of each lens for defects.

64. The method of claim 59, further including the step of normalizing the light intensity of each of said images to correct for variations in ambient light.

65. A method for automatically inspecting a plurality of lenses, comprising the steps of:
obtaining at least one image of each lens;
defining a plurality of light sensing regions in an optical zone portion of each of said images;
determining the deviation in brightness across each of said regions;
assigning a number score to each region based upon the magnitude of the deviation in brightness across the regions; and
rejecting a lens when the sum of the scores for the regions of its image exceeds a predefined threshold.

66. A method for automatically inspecting a plurality of lenses, comprising the steps of:
obtaining at least one image of each lens;
determining the light intensity of each pixel of a predefined portion of each of said images;
defining a light intensity threshold for enhancing the contrast of said predefined portion;
setting pixels with light intensities equal to or above the threshold to "1" and light intensities below the threshold to "0"; and
analyzing the resultant pixel values to detect areas of excessive brightness.

67. The method of claim 66, wherein said defining step includes setting said threshold to be 20 brightness steps lower than the average brightness at the center of the optical zone of said lens.

68. The method of claim 66, further including steps for analyzing a printed iris annular area of a lens, the steps including:
defining an inspection box having a cross-sectional area corresponding in size to the smallest clear gap in said printed iris that would lead to rejection of the lens;
scanning said inspection box over a matrix of said resultant pixel values for said printed iris area; and
rejecting said lens if the sum of resultant pixel values within the inspection box is greater than a predefined inspection box threshold.

69. The method of claim 68, wherein said predefined inspection box threshold is 80% of the size of the inspection box.

70. The method of claim 66, further including steps for analyzing printed characters on said lens, the steps including:
(a) defining said light intensity threshold for separating said relatively dark printed characters from other dark patterns on said lens;
(b) forming a character matrix of said resultant pixel values for the area of said printed characters;
(c) selecting the first character as the largest contiguous set of dark pixels in said character matrix;
(d) calculating the corners and center of a box that contains said first character;
(e) selecting the next character as the next largest contiguous set of dark pixels in said character matrix;
(f) calculating the corners and center of a box that contains said next character;
(g) repeating steps (e) and (f) until all characters have been selected; and
(h) evaluating at least one geometric characteristic of at least one of said boxes relative to at least one acceptance specification to determine whether the characters are acceptable.

71. The method of claim 70, wherein said geometric characteristic includes the distance between the centers of at least two character boxes.

72. The method of claim 70, wherein said geometric characteristic includes the width of at least one of said boxes.

73. The method of claim 70, wherein said geometric characteristic includes the height of at least one of said boxes.

74. The method of claim 70, wherein said geometric characteristic includes the aspect ratio of the height and width of at least one of said boxes.

75. The method of claim 70, wherein said geometric characteristic includes the area of least one of said boxes.

76. The method of claim 70, wherein said geometric characteristic includes the location of the center of at least one of said boxes.

77. The method of claim 66, further including the steps of:
generating a polynomial model of the edge of said lens;
comparing the measured light intensities of the pixels adjacent to the edge of each of said images to the light intensities of said model at predefined angles around the edges of the images;
generating an edge profile number for each such angular edge comparison that is representative of how well the measured edge profile of the image compares to the model;
locating the points on the edge profiles for each of said images that have numbers representative of a mismatch; and
rejecting a lens if the number of mismatches for the image exceeds a predefined number.

78. A method for automatically inspecting a plurality of lenses, comprising the steps of:
placing each lens in solution in a cuvette,
taking a first image of each lens in solution in its cuvette;
rotating each cuvette and the lens and solution in the cuvette;
taking a second image of each lens in solution in the rotated cuvette,
normalizing the light intensity of each image;
providing a digital representation of the light intensity at each pixel of said images;
locating the center of each of said images;
storing polar coordinate light intensity data for each image in a rectangular S-matrix;
comparing with an affine transform the pixels of at least a portion of the S-matrix of each first image and the transformed pixels of the corresponding portion of the S-matrix of said second image;
generating a resultant image for each lens with pixels that each have the same light intensity as the brighter of the two corresponding compared pixels; and
analyzing said resultant image for defects in an optical zone of each lens.

79. The method of claim 78, further including the step of analyzing said resultant image for defects in a logo pattern of each lens.

80. The method of claim 78, further including the step of analyzing said resultant image for defects in a color printed area of each lens.

81. An apparatus for automatically inspecting lenses, comprising:
a transparent cuvette for holding a contact lens in solution in a first position;

means for moving the cuvette, lens and solution relative to one another and stopping the movement at a second position;

means for momentarily illuminating the lens and cuvette in said first and second positions;

means for recording a first image of the lens and cuvette at the first position and a second image of the lens and cuvette at the second position;

means for comparing said first and second recorded images of each lens;

means for generating a resultant image from the comparison of said images; and means for recognizing as lens defects the defect features of said first image that have corresponding defect features in the second image.

82. The apparatus of claim 81, wherein said means for generating includes means for generating said resultant image with pixels that each have the same light intensity as the brighter of the two corresponding compared pixels from the first and second images.

83. The apparatus of claim 81, wherein said means for momentarily illuminating includes at least one strobe light.

84. The apparatus of claim 81, wherein said means for momentarily illuminating includes at least one strobe light for generating a flash of light; at least one diffuser for diffusing said flash of light; and at least one multihole collimator for collimating the diffused flash of light.

85. The apparatus of claim 81, wherein said means for recording includes at least one digital camera.

86. The apparatus of claim 81, wherein said means for momentarily illuminating includes two spaced illumination stations, the first station associated with said first image and the second station associated with said second image, each station having a strobe light for generating a flash of light, a diffuser for diffusing said flash of light; and a multihole collimator for collimating the diffused flash of light.

87. The apparatus of claim 81, wherein said means for recording includes two spaced digital cameras, the first camera for recording said first image and the second camera for recording said second image of each lens.

* * * * *

UNITED STATES PATENT AND TRADEMARK OFFICE
CERTIFICATE OF CORRECTION

PATENT NO.    : 6,047,082
DATED         : April 4, 2000
INVENTOR(S)   : Harvey E. Rhody et al.

It is certified that error appears in the above-identified patent and that said Letters Patent is hereby corrected as shown below:

<u>Column 32,</u>
Line 32, after "holder" delete "," (comma) and substitute -- ; -- (semicolon) in its place.

<u>Column 38,</u>
Line 34, delete "50" and substitute -- 45 -- in its place.

Column 40,
Line 14, before "least" insert -- at --.

Signed and Sealed this

Thirteenth Day of August, 2002

*Attest:*

*Attesting Officer*

JAMES E. ROGAN
*Director of the United States Patent and Trademark Office*